US008641565B2

(12) United States Patent
Young et al.

(10) Patent No.: US 8,641,565 B2
(45) Date of Patent: Feb. 4, 2014

(54) INVERTED TOOTH CHAIN SPROCKET WITH FREQUENCY MODULATED MESHING

(75) Inventors: James D. Young, Chesaning, MI (US); Darren J. Stewart, Howell, MI (US); John E. Minden, Paris, AR (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 615 days.

(21) Appl. No.: 12/151,944

(22) Filed: May 9, 2008

(65) Prior Publication Data

US 2008/0312017 A1  Dec. 18, 2008

Related U.S. Application Data

(60) Provisional application No. 60/928,760, filed on May 11, 2007, provisional application No. 60/933,167, filed on Jun. 5, 2007.

(51) Int. Cl.
*F16H 7/06* (2006.01)

(52) U.S. Cl.
USPC .......................................... 474/157; 474/156

(58) Field of Classification Search
USPC .................. 474/148, 156, 157, 161, 212, 213
See application file for complete search history.

(56) References Cited

U.S. PATENT DOCUMENTS

| | | | |
|---|---|---|---|
| 3,377,875 A * | 4/1968 | Sand | 474/94 |
| 3,495,468 A * | 2/1970 | Griffel | 474/157 |
| 4,168,634 A * | 9/1979 | Griffel | 474/148 |
| 4,509,323 A * | 4/1985 | Ledvina et al. | 59/8 |
| 4,758,209 A * | 7/1988 | Ledvina | 474/156 |

(Continued)

FOREIGN PATENT DOCUMENTS

| | | |
|---|---|---|
| EP | 1 235 003 A1 | 8/2002 |
| EP | 1 281 890 A2 | 2/2003 |

(Continued)

OTHER PUBLICATIONS

International Preliminary Report on Patentability mailed Nov. 17, 2009 for International application No. PCT/US2008/006013.

(Continued)

*Primary Examiner* — William A Rivera
*Assistant Examiner* — Henry Liu
(74) *Attorney, Agent, or Firm* — Fay Sharpe LLP

(57) ABSTRACT

An inverted tooth chain drive system includes an inverted tooth chain structured for inside flank engagement. The chain includes link rows each including leading inside flanks that project outwardly relative to trailing outside flanks of a preceding link row. The system further includes a sprocket with which said inverted tooth chain is drivingly engaged. The sprocket includes a plurality of teeth circumferentially spaced about an axis of rotation, each tooth comprising an engaging flank and a disengaging flank. Some of the teeth are defined with a first tooth form in which said engaging flank thereof is defined with a first pressure angle and others of said teeth are defined with a second tooth form in which the engaging flank thereof is defined with a second pressure angle that is different from the first pressure angle in order to stagger or modulate the initial meshing impacts between the leading inside flanks of the chain and engaging flanks of the sprocket teeth. The sprocket can be optimized for manufacture by a hobbing process, by arranging the different tooth forms in a specific "hob-compatible" pattern.

16 Claims, 19 Drawing Sheets

(56) References Cited

U.S. PATENT DOCUMENTS

| | | | |
|---|---|---|---|
| 4,832,668 A * | 5/1989 | Ledvina et al. | 474/155 |
| 4,915,676 A * | 4/1990 | Komeya | 474/213 |
| 5,154,674 A * | 10/1992 | Avramidis et al. | 474/214 |
| 5,236,400 A * | 8/1993 | Tsuyama | 474/217 |
| 5,267,910 A * | 12/1993 | Maruyama et al. | 474/212 |
| 5,453,059 A * | 9/1995 | Avramidis et al. | 474/212 |
| 5,628,702 A * | 5/1997 | Kotera | 474/213 |
| 5,876,295 A * | 3/1999 | Young | 474/156 |
| 5,921,878 A * | 7/1999 | Young | 474/160 |
| 5,921,879 A * | 7/1999 | Young | 474/202 |
| 5,976,045 A * | 11/1999 | Young | 474/160 |
| 5,993,344 A * | 11/1999 | Young | 474/160 |
| 5,997,424 A * | 12/1999 | Young | 474/156 |
| 6,090,003 A * | 7/2000 | Young | 474/160 |
| 6,179,741 B1 * | 1/2001 | Young | 474/161 |
| 6,325,734 B1 * | 12/2001 | Young | 474/202 |
| 6,325,735 B1 * | 12/2001 | Kanehira et al. | 474/212 |
| 6,371,875 B2 * | 4/2002 | Young | 474/161 |
| 6,413,180 B1 * | 7/2002 | Kanehira et al. | 474/164 |
| 6,416,436 B1 * | 7/2002 | Kanehira et al. | 474/212 |
| 6,461,263 B2 * | 10/2002 | Suzuki et al. | 474/213 |
| 6,533,107 B2 * | 3/2003 | Suzuki et al. | 198/834 |
| 6,663,522 B2 * | 12/2003 | Horie | 474/212 |
| 7,416,500 B2 | 8/2008 | Young et al. | |
| 2001/0007842 A1 * | 7/2001 | Suzuki et al. | 474/213 |
| 2002/0045504 A1 * | 4/2002 | Suzuki et al. | 474/212 |
| 2002/0058561 A1 * | 5/2002 | Kanehira et al. | 474/213 |
| 2002/0128101 A1 * | 9/2002 | Baddaria | 474/156 |
| 2002/0132689 A1 * | 9/2002 | Young | 474/156 |
| 2003/0027675 A1 * | 2/2003 | Suzuki et al. | 474/212 |
| 2004/0166978 A1 * | 8/2004 | Matsuda et al. | 474/212 |
| 2004/0185977 A1 | 9/2004 | Young et al. | |
| 2006/0058141 A1 * | 3/2006 | Young | 474/213 |
| 2006/0068959 A1 * | 3/2006 | Young et al. | 474/212 |
| 2006/0252592 A1 * | 11/2006 | Young | 474/161 |
| 2007/0155564 A1 * | 7/2007 | Ledvina et al. | 474/215 |
| 2008/0167151 A1 * | 7/2008 | Yonehara et al. | 474/212 |
| 2008/0312017 A1 * | 12/2008 | Young et al. | 474/148 |

FOREIGN PATENT DOCUMENTS

| | | |
|---|---|---|
| EP | 1 426 655 A2 | 3/2005 |
| EP | 1 426 655 A3 | 3/2005 |
| JP | 55-024203 | 2/1980 |
| JP | 56-150655 | 11/1981 |

OTHER PUBLICATIONS

SAE Technical Paper Series, 1999-01-1226, Wada, Masakazu et al., "Development of a Small Pitch Silent Chain for a Single-Stage Cam Drive System", Mar. 1999.

Huang, Chintien et al., "The Tooth Contact Analysis of Round Pin Jointed Silent Chains", ASME 2005 International Design Engineering Technical Conferences & Computers and Information in Engineering Conference, DETC2005-84065, Sep. 2005.

Bucknor, Norman Kenneth, "Kinematic and static force analysis of silent chain drives", Columbia University, 1991.

International Search Report mailed May 25, 2009 for International application No. PCT/US2008/006013.

Written Opinion mailed May 25, 2009 for International application No. PCT/US2008/006013.

Young, "*Inverted Tooth Chain Sprocket with Frequency-Modulated Meshing Features to Reduce Camshaft Drive Noise*", SAE Technical Paper Series, 2007-01-2297, May 2007.

* cited by examiner

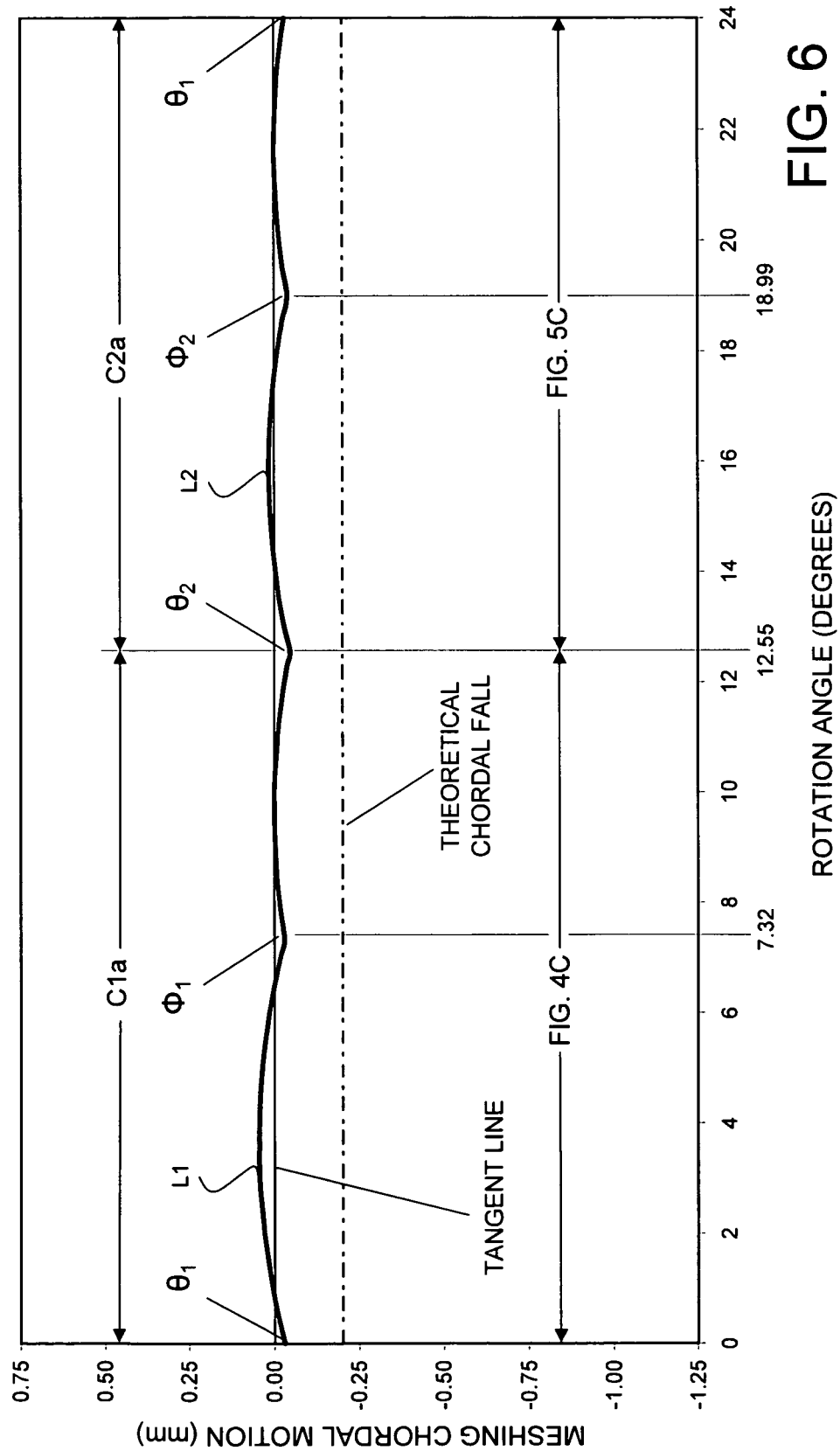

TOOTH FORM RANDOM MESHING PATTERN

INITIAL CONTACT ANGLES

| TOOTH NO. | $\theta_1$ 15.55° | $\theta_2$ 15.00° |
|---|---|---|
| 1 | PA1 | |
| 2 | | PA2 |
| 3 | PA1 | |
| 4 | | PA2 |
| 5 | PA1 | |
| 6 | PA1 | |
| 7 | PA1 | |
| 8 | | PA2 |
| 9 | PA1 | |
| 10 | PA1 | |
| 11 | | PA2 |
| 12 | PA1 | |
| 13 | | PA2 |
| 14 | PA1 | |
| 15 | PA1 | |
| 16 | PA1 | |
| 17 | PA1 | |
| 18 | | PA2 |
| 19 | PA1 | |
| 20 | | PA2 |
| 21 | PA1 | |
| 22 | | PA2 |
| 23 | PA1 | |
| 24 | PA1 | |
| 25 | | PA2 |
| 26 | PA1 | |
| 27 | PA1 | |
| 28 | PA1 | |
| 29 | | PA2 |
| 30 | PA1 | |
| $\Delta_i°$ | - | 0.55° |

FIG. 7

TOOTH FORM
3-TOOTH REPEATING MESHING PATTERN

INITIAL CONTACT ANGLES

| TOOTH NO. | $\theta_1$ 15.55° | $\theta_2$ 15.00° |
|---|---|---|
| 1 | PA1 | |
| 2 | PA1 | |
| 3 | | PA2 |
| 4 | PA1 | |
| 5 | PA1 | |
| 6 | | PA2 |
| 7 | PA1 | |
| 8 | PA1 | |
| 9 | | PA2 |
| 10 | PA1 | |
| 11 | PA1 | |
| 12 | | PA2 |
| 13 | PA1 | |
| 14 | PA1 | |
| 15 | | PA2 |
| 16 | PA1 | |
| 17 | PA1 | |
| 18 | | PA2 |
| 19 | PA1 | |
| 20 | PA1 | |
| 21 | | PA2 |
| 22 | PA1 | |
| 23 | PA1 | |
| 24 | | PA2 |
| 25 | PA1 | |
| 26 | PA1 | |
| 27 | | PA2 |
| 28 | PA1 | |
| 29 | PA1 | |
| 30 | | PA2 |
| $\Delta_i°$ | - | 0.55° |

FIG. 9A

TOOTH FORM
5-TOOTH REPEATING
MESHING PATTERN

INITIAL CONTACT ANGLES

| TOOTH NO. | $\theta_1$ 15.55° | $\theta_2$ 15.00° |
|---|---|---|
| 1 | PA1 | |
| 2 | | PA2 |
| 3 | PA1 | |
| 4 | PA1 | |
| 5 | | PA2 |
| 6 | PA1 | |
| 7 | | PA2 |
| 8 | PA1 | |
| 9 | PA1 | |
| 10 | | PA2 |
| 11 | PA1 | |
| 12 | | PA2 |
| 13 | PA1 | |
| 14 | PA1 | |
| 15 | | PA2 |
| 16 | PA1 | |
| 17 | | PA2 |
| 18 | PA1 | |
| 19 | PA1 | |
| 20 | | PA2 |
| 21 | PA1 | |
| 22 | | PA2 |
| 23 | PA1 | |
| 24 | PA1 | |
| 25 | | PA2 |
| 26 | PA1 | |
| 27 | | PA2 |
| 28 | PA1 | |
| 29 | PA1 | |
| 30 | | PA2 |
| $\Delta_i°$ | - | 0.55° |

FIG. 9B

INVERTED TOOTH CHAIN SPROCKET WITH FREQUENCY MODULATED MESHING

CROSS-REFERENCE TO RELATED APPLICATIONS

This applications claims priority from and benefit of the filing date of the following U.S. provisional patent applications, both of which are hereby expressly incorporated by reference into this specification: (i) U.S. provisional application Ser. No. 60/928,760 filed May 11, 2007; and, (ii) U.S. provisional application Ser. No. 60/933,167 filed Jun. 5, 2007.

BACKGROUND

The impact resulting from the chain-sprocket meshing phenomena has long been recognized as a dominant noise source associated with automotive engine chain drive systems and this impact occurs as the chain links leave the span and collide with the sprocket teeth during engagement. The meshing impacts are repeated with a frequency generally equal to that of the frequency of the chain meshing with the sprocket. It is known that chain drive noise levels can be effectively reduced by modulating the meshing frequency and this can be achieved in various ways—but always by altering the rhythm of the chain-sprocket meshing impacts. One prior art method to modulate the meshing impacts was accomplished with a modification to the chain by introducing a second inside link form having a slightly different profile and these new links were arrayed in a defined pattern and assembled into the chain by link row. Another prior art solution to modulate meshing impacts was accomplished by altering the sprocket teeth by incorporating at least two different tooth forms arrayed in a defined pattern for the full complement of sprocket teeth.

SUMMARY

In accordance with one aspect of the present development, a sprocket is adapted to mesh with an associated inverted tooth chain. The sprocket includes a plurality of teeth circumferentially spaced about an axis of rotation, each tooth comprising an engaging flank and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is different from said first pressure angle.

In accordance with another aspect of the present development, a method of manufacturing a sprocket for meshing with an inverted tooth chain includes processing a cylindrical steel blank using a hob to remove material from said steel blank to define a sprocket in a remaining portion of said steel blank. The sprocket includes plurality of teeth circumferentially spaced about an axis of rotation, each tooth including an engaging flank and a disengaging flank, wherein some of the teeth are defined with a first tooth form in which said engaging flank thereof comprises a first shape and others of said teeth are defined with a second tooth form in which said engaging flank thereof comprises a second shape that is different from said first shape, wherein said teeth comprising said first and second tooth forms are arranged in a repeating pattern so as to define a hob-compatible relationship:

$$W = N/NP$$

where N=a sprocket tooth count equal to the total number of said plurality of teeth, NP=number of teeth in the repeating pattern, and W=a positive integer.

In accordance with another aspect of the present development, an inverted tooth chain drive system includes an inverted tooth chain structured for inside flank engagement. The chain includes link rows each including leading inside flanks that project outwardly relative to trailing outside flanks of a preceding link row. The system further includes a sprocket with which said inverted tooth chain is drivingly engaged. The sprocket includes a plurality of teeth circumferentially spaced about an axis of rotation, each tooth comprising an engaging flank and a disengaging flank, wherein some of the teeth are defined with a first tooth form in which said engaging flank thereof is defined with a first pressure angle and others of said teeth are defined with a second tooth form in which the engaging flank thereof is defined with a second pressure angle that is different from the first pressure angle.

According to another aspect of the present development, an inverted tooth chain drive system includes an inverted tooth chain and a sprocket engaged with the inverted tooth chain. The sprocket includes a plurality of teeth circumferentially spaced about an axis of rotation, each tooth including an engaging flank and a disengaging flank. Circumferentially successive teeth are separated from each other by respective tooth spaces partially defined an engaging flank of a first tooth and a disengaging flank of a second tooth, with the disengaging flank of the second tooth being a mirror image of the engaging flank of the first tooth. The respective engaging flanks of some of the teeth are defined with a first pressure angle and the respective engaging flanks of others of said teeth are defined with a second pressure angle that is larger than the first pressure angle so that the respective engaging flanks of the teeth defined with the first pressure angle are steeper as compared to the respective engaging flanks of the teeth defined with the second pressure angle.

BRIEF DESCRIPTION OF DRAWINGS

The invention comprises various components and arrangements of components, preferred embodiments of which are illustrated in the accompanying drawings wherein:

FIG. 6 graphically illustrates the meshing dynamics of FIGS. 4C and 5C in terms of chordal motion of the meshing chain link row versus sprocket angular rotation;

FIG. 7 graphically illustrates the pattern of the two different tooth forms (in terms of engaging flank pressure angle) and the initial meshing contact angles for the sprocket of FIG. 1;

FIG. 9A graphically illustrates the repeating pattern and the initial meshing contact angles for the sprocket of FIG. 8A;

FIG. 9B graphically illustrates the repeating pattern and the initial meshing contact angles for the sprocket of FIG. 8B.

DETAILED DESCRIPTION OF THE INVENTION

Figure 1:
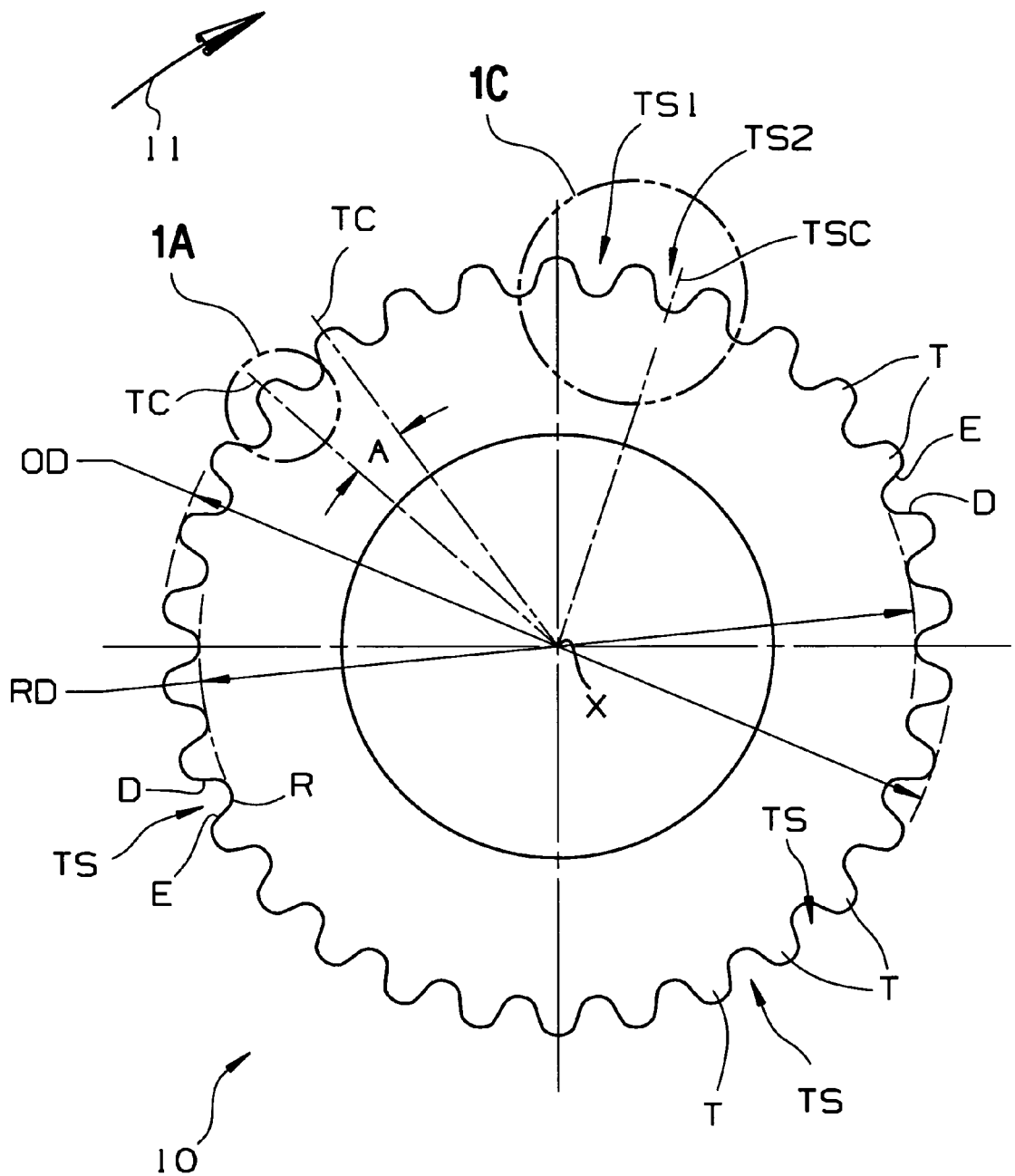
FIG. 1 is a front elevational view of an inverted tooth chain sprocket having two different tooth forms (in terms of engaging flank pressure angle) in accordance with the present invention.

FIG. 1 is a front elevational view of an inverted tooth chain sprocket 10 having two different tooth forms (in terms of their engaging flank pressure angles) according to the present invention. As described below, the sprocket 10 is preferably defined to be bi-directional, i.e., it can be rotated in either direction with the same effect. For purposes of describing the sprocket in the drawings, it is described relative to a clockwise direction of rotation as indicated by the arrow 11. The sprocket 10 rotates about a center or axis of rotation X and comprises a plurality of radially projecting teeth T that are evenly circumferentially spaced about the axis of rotation X. Tooth spaces TS are defined between successive teeth. Each tooth comprises a leading or engaging flank E and a following or disengaging flank D in terms of the direction of rotation 11, wherein the engaging flank E makes contact with the associated chain as the chain meshes with the sprocket (if the sprocket is rotated in an opposite direction, the designation of the engaging flank and disengaging flanks is reversed). As such, each of the tooth spaces TS is defined by the engaging flank of a tooth and the disengaging flank of the preceding tooth in terms of direction of rotation, as well as a root surface R that extends therebetween. Each tooth T is bisected by a tooth center (through which the radial line TC extends), and the tooth centers are spaced evenly circumferentially about the axis of rotation X at a tooth angle A defined as A=360°/N where N is the total number of teeth T. Correspondingly, each tooth space TS is centered about a tooth space center TSC. As described in further detail below, some of the tooth spaces TS1 are defined by engaging and disengaging flanks shaped according to a first pressure angle, while other tooth spaces TS2 are defined by engaging and disengaging flanks shaped according to a second pressure angle. Although the illustrated sprocket 10 includes engaging and disengaging flanks defined according to one of two possible pressure angles, alternatively, the engaging and disengaging flanks can be defined according to one of three or more possible pressure angles, and it is not intended that the invention be limited to the illustrated embodiment. The sprocket 10 is further defined by a root diameter RD and an outside or "tip" diameter OD. A tooth center TC can be determined by bisecting the angle defined between two successive tooth spaces.

Figure 1A:
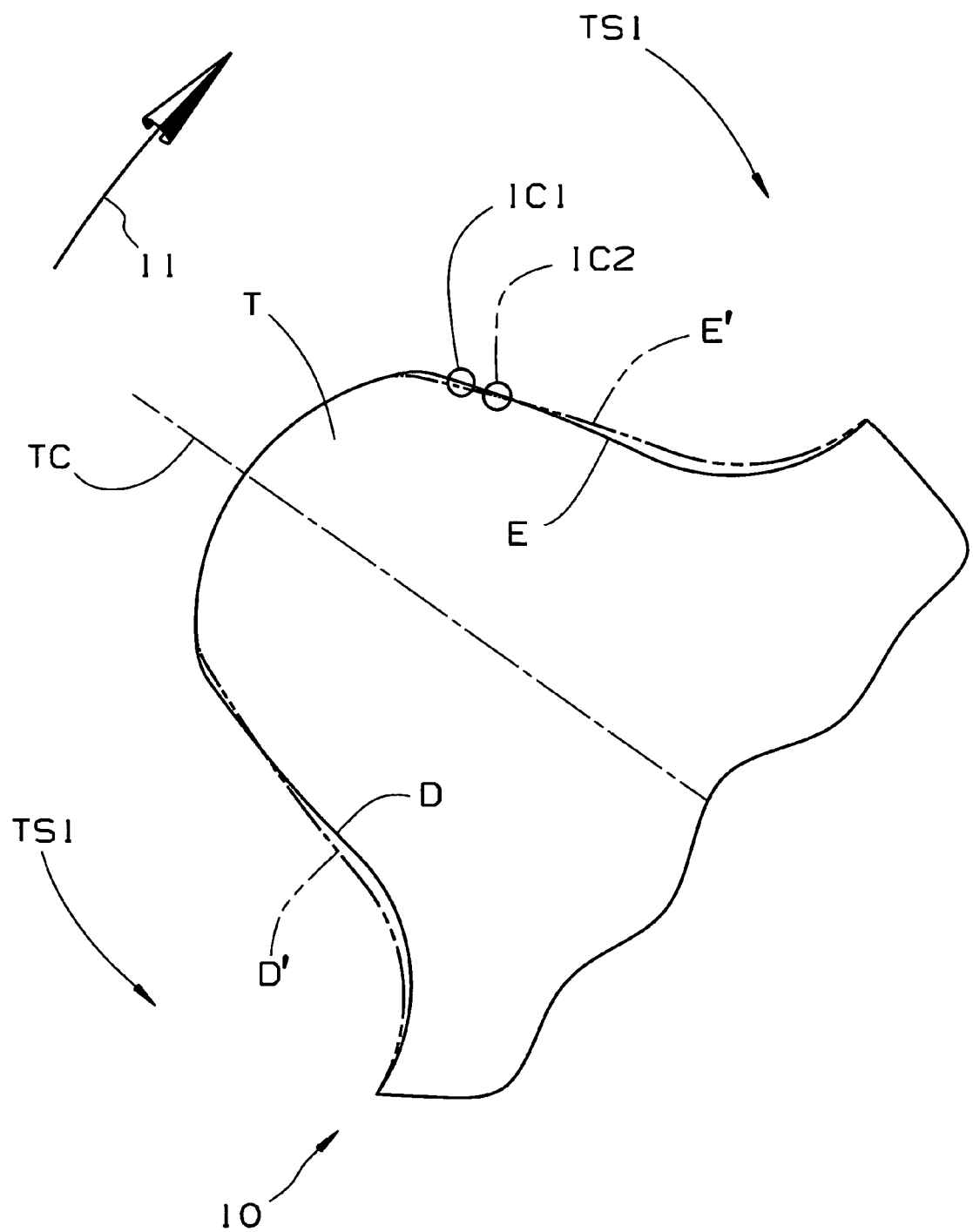
FIG. 1A is an enlarged detail view of portion 1A of FIG. 1 showing a single tooth having a engaging and disengaging flanks defined with a first pressure angle, and further showing a phantom line overlay of a tooth form having engaging and disengaging flanks defined with a second pressure angle.
Figure 1B:
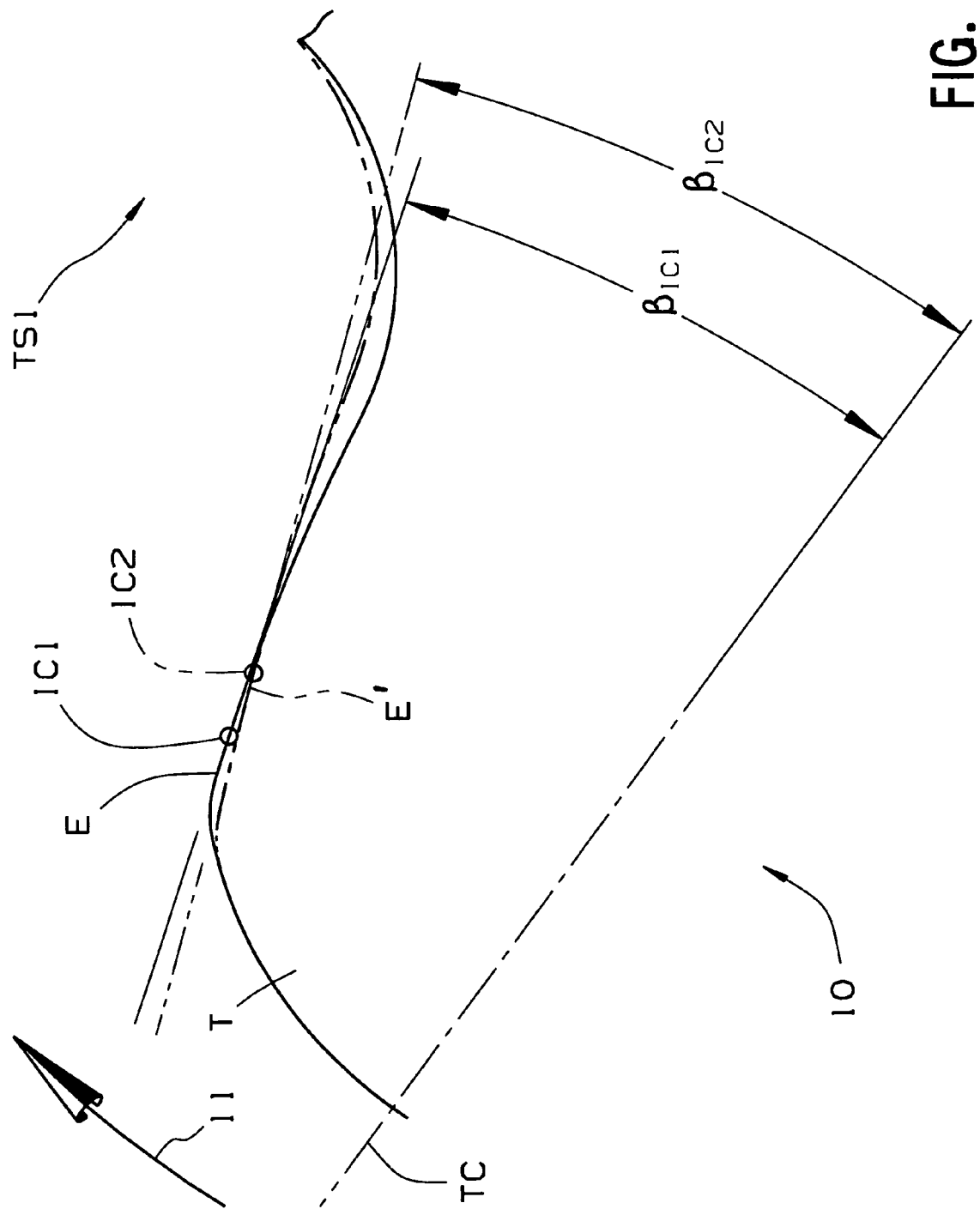
FIG. 1B is a greatly enlarged view of the engaging flank portion of the tooth overlay of FIG. 1A to illustrate the differences in the first and second tooth forms as a function of the differences in the first and second pressure angles.

FIG. 1A is an enlarged detail view of portion 1A of FIG. 1 showing a single tooth T having a engaging and disengaging flanks E,D defined with a first pressure angle (referred to herein as PA1), and further showing a phantom line overlay of a tooth form having engaging and disengaging flanks E',D' defined with a second pressure angle (referred to herein as PA2), where PA2>PA1. It can be seen that the flanks E,D defined with the smaller pressure angle PA1 are "steeper" as compared to the overlay flanks E',D' defined with the larger pressure angle PA2. This leads to the associated chain making initial meshing contact with the engaging flank E at a location IC1 and making initial meshing contact with the engaging flank E' at a location IC2 that is located radially inward from IC1. FIG. 1B is a greatly enlarged view of the engaging flank portion of the tooth overlay of FIG. 1A and further illustrates the engaging flank differences resulting from the first and second pressure angles PA1,PA2. In FIG. 1B, a flank angle $\beta_{IC1}$ is defined between the radial tooth center line TC that extends through the axis of rotation X and the tooth center and a second reference line tangent to the contact location IC1 of engaging flank E. Likewise, a flank angle $\beta_{IC2}$ is defined between the radial tooth center line TC and a second reference line tangent to the contact location IC2 of engaging flank E'. Because the pressure angle PA2 of the engaging flank E' is greater than the pressure angle PA1 of the engaging flank E (i.e., PA2>PA1), correspondingly $\beta_{IC2}$>$\beta_{IC1}$.

Figure 1C:
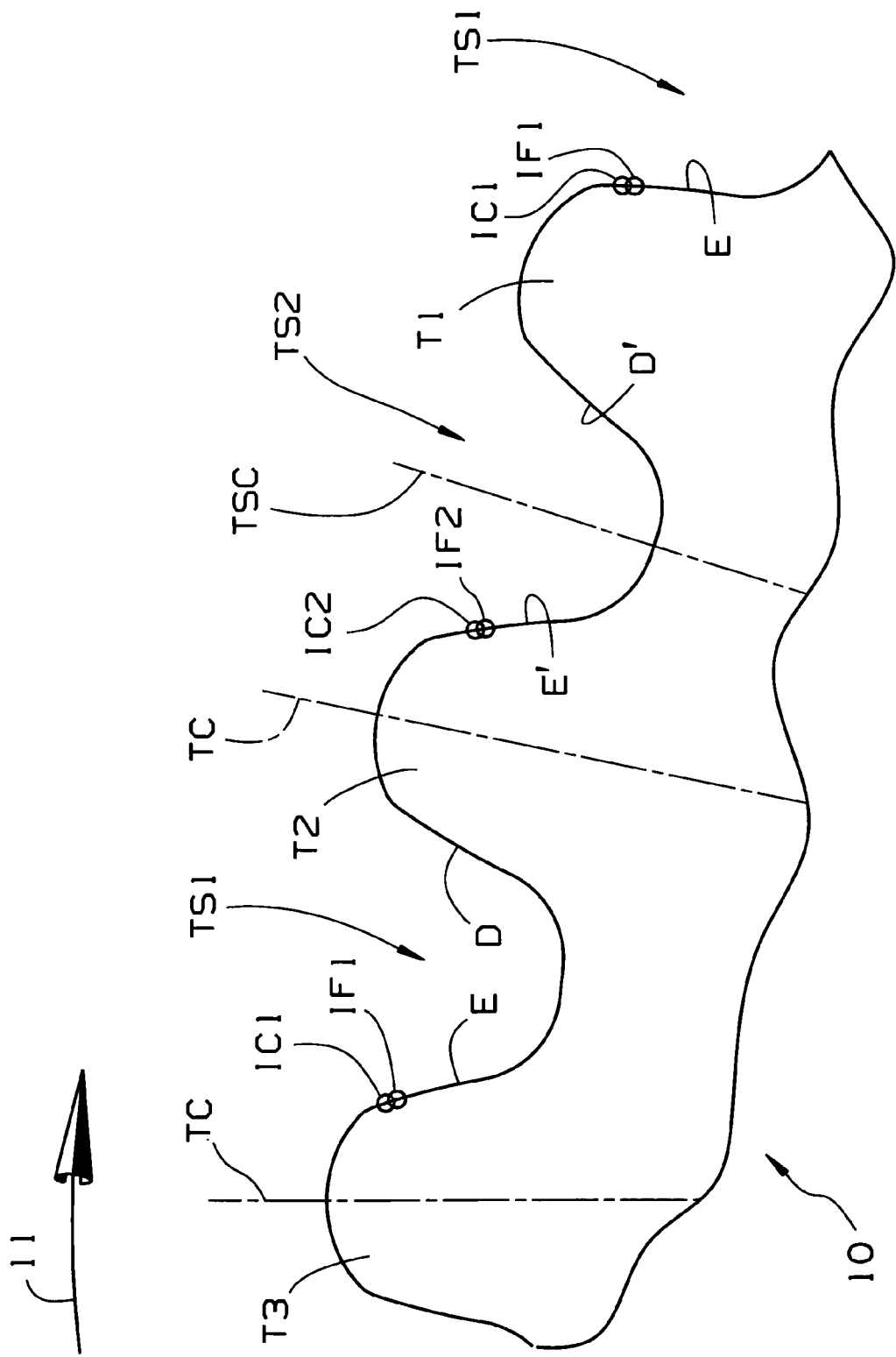
FIG. 1C is an enlarged detail view of portion 1B of FIG. 1 showing three consecutive teeth and two consecutive tooth spaces for the sprocket shown in FIG. 1.

FIG. 1C is an enlarged detail view of portion 1C of FIG. 1 showing three consecutive teeth T1,T2,T3 and two consecutive tooth spaces TS for the sprocket shown in FIG. 1. The tooth space between the teeth T1,T2 is designated TS2 because the engaging and disengaging flanks E',D' thereof are defined according to the second pressure angle PA2. Correspondingly, the tooth space between the teeth T2,T3 is designated TS1 because the engaging and disengaging flanks E,D thereof are defined according to the first pressure angle PA1. Those of ordinary skill in the art will recognize that this symmetry for the tooth space TS2 requires the tooth T2 to be asymmetric in the sense that, although it is centered relative to its tooth center TC, the engaging and disengaging flanks E',D thereof are defined with different pressure angles, i.e., the second and first pressure angles PA2,PA1, respectively. All tooth spaces TS of the sprocket 10 are symmetrical, with the engaging and disengaging side flanks thereof being defined according to the same pressure angle PA1 or PA2 (or some other pressure angle). For example, the tooth space TS1 defined between teeth T1,T2 includes engaging and disengaging flanks E,D both defined according to the first pressure angle PA1. It should be noted here that the preferred arrangement, where the tooth spaces TS1,TS2 are symmetrical, facilitates manufacture of the sprocket 10 by hobbing.

With continuing reference to FIG. 1C, for the teeth T1 and T3, having engaging flanks E defined with the first pressure angle PA1, the leading inside flanks Fi of the associated chain link row W will make initial meshing contact at respective locations IC1 (see e.g., chain link row W1 of FIG. 4A) and thereafter move radially inward to a location IF1. For the tooth T2, the leading inside flanks Fi of the associated chain link row W will make initial contact at location IC2 (see e.g., chain link row W2 of FIG. 5A) and then move radially inward to a location IF2, and both locations IC2,IF2 are located radially inward as compared to the respective corresponding locations IC1,IF1.

Figure 2:
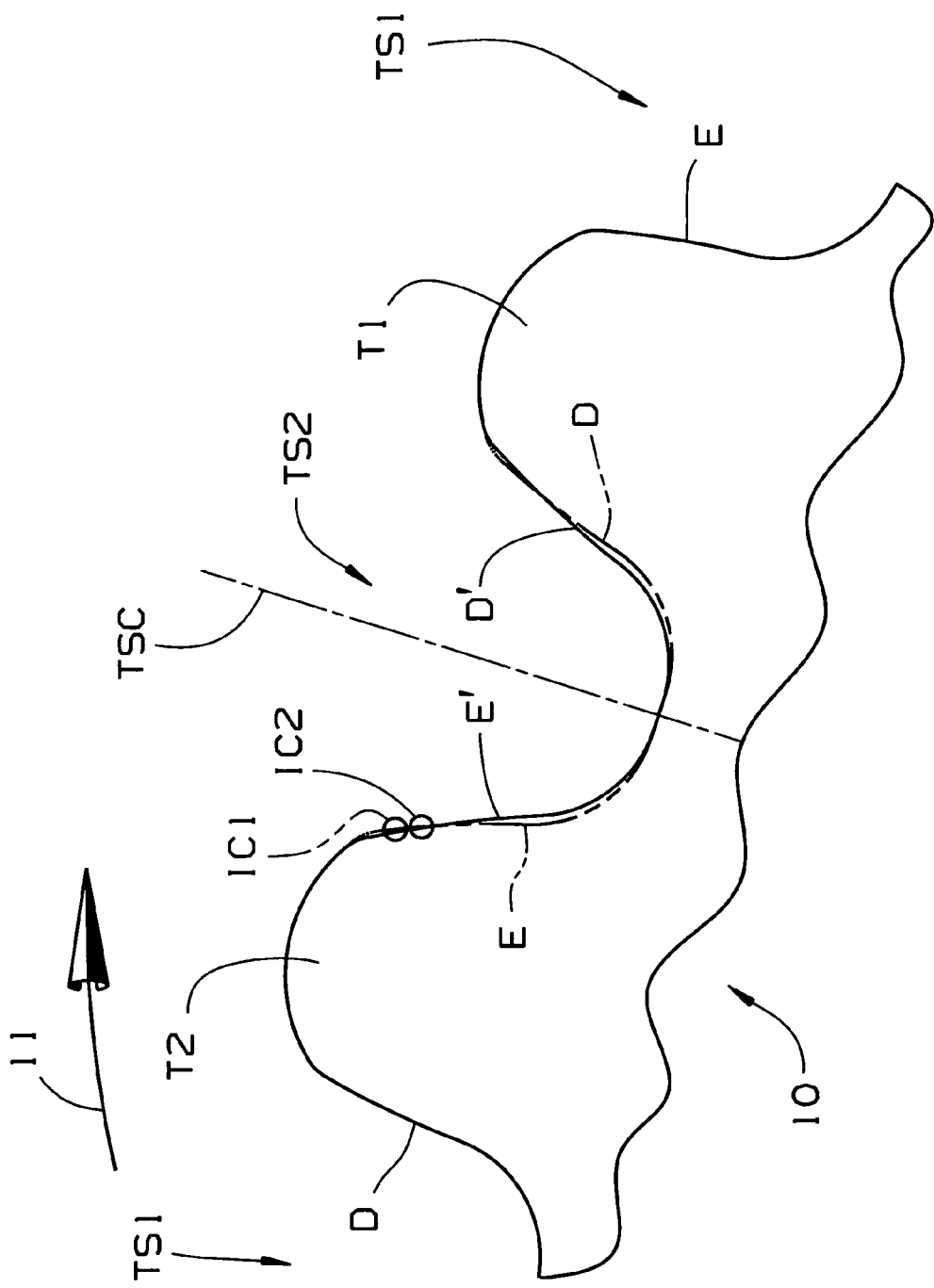
FIG. 2 is an enlarged view that shows two consecutive teeth of the sprocket of FIG. 1 and the tooth space therebetween, and shows that the tooth space is symmetrical, with the engaging side flank being identical to the disengaging side flank and defined with the second pressure angle (for both the engaging side and disengaging side flanks a flank defined with the first pressure angle is shown as an overlay with phantom lines)

FIG. 2 is a partial enlarged view that shows the two consecutive teeth T1,T2 of FIG. 1C and the tooth space TS2 therebetween. FIG. 2 shows, as described above, that the tooth space TS2 is symmetrical, with the engaging and disengaging side flanks E',D'defined according to the second pressure angle PA2. Phantom lines are overlayed to show engaging and disengaging flanks E,D, defined according to the first pressure angle PA1 which facilitates an understanding of the present invention.

Figure 3A:
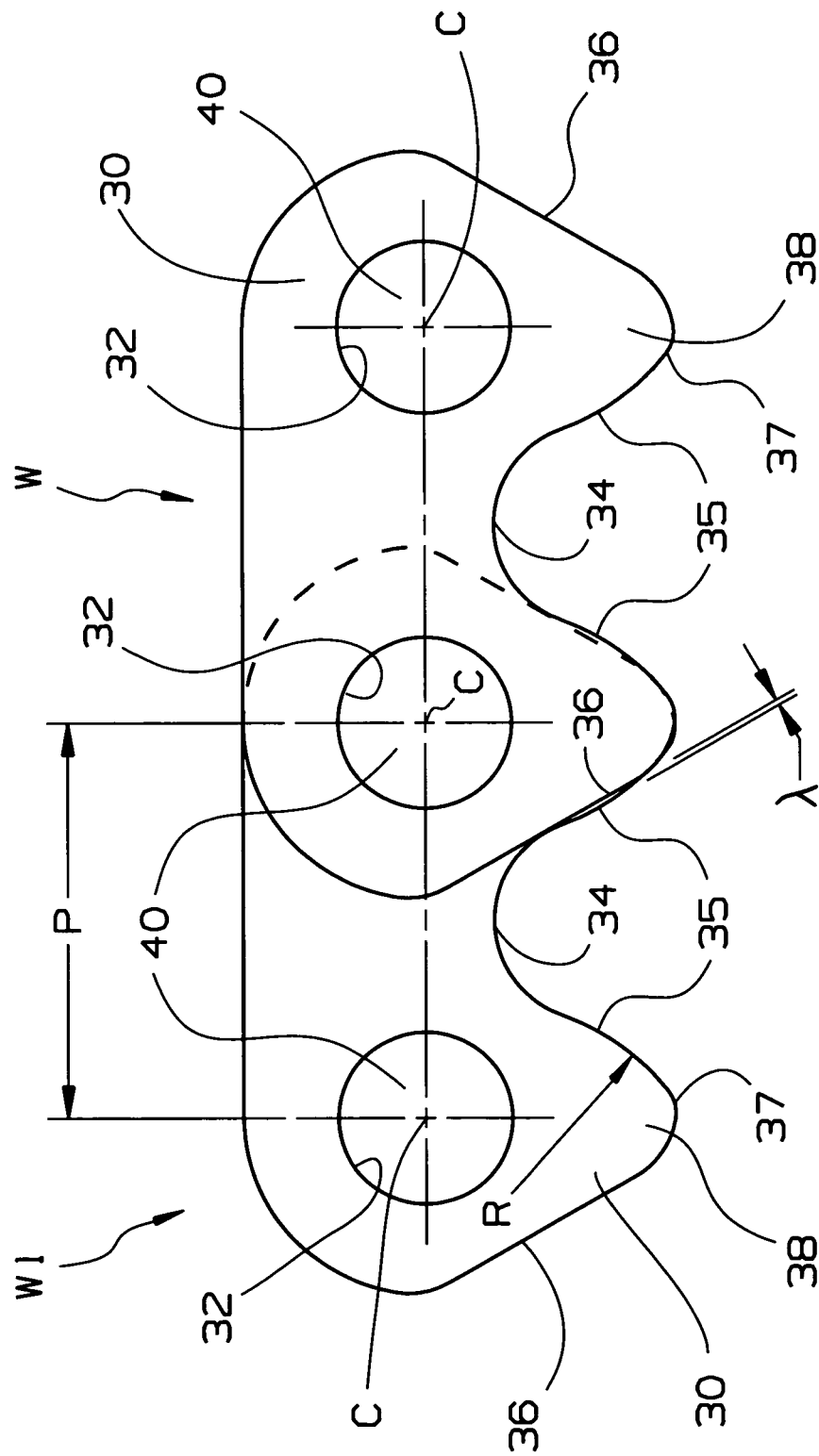
FIGS. 3A and 3B are partial side and plan views of an inverted tooth chain adapted for inside flank initial contact meshing with a sprocket formed according to the present development (guide link plates are removed from FIG. 3A to reveal the underlying inside link plates)
Figure 3B:
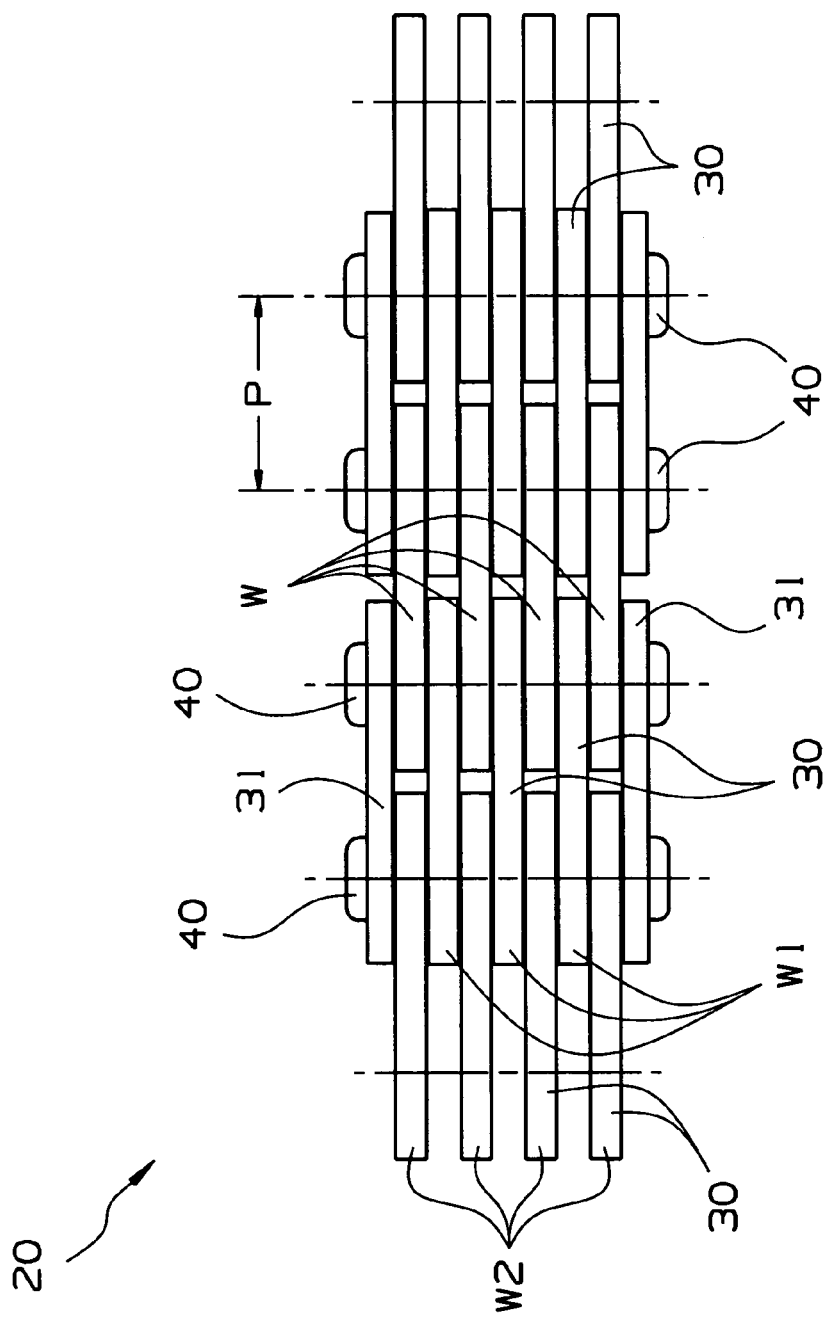

The sprocket 10 is specially structured and intended to mesh with an inside flank engagement inverted tooth chain, such as the chain 20 shown in FIGS. 3A and 3B or another inside flank engagement inverted tooth chain. FIG. 3B is a plan view of the chain 20 and shows one standard chain lacing having rows W1, W2, etc. (generally rows W) of interleaved inside links 30 connected in an endless fashion, with successive rows W pivotally interconnected by pivot pins 40 installed in apertures 32 (FIG. 3A). The pins 40 define pivot axes C about which the interconnected link rows W articulate relative to each other. In the case of round pins 40, the pivot axes C are the centers of the pins 40. The pivot axes C are evenly spaced from each other at a chain pitch distance P and are referred to herein as "pin centers" As is known in the art of inverted tooth chains, the chain 20 includes guide link plates 31 (shown in FIG. 3B but not shown in FIG. 3A in order to reveal the underlying inside links 30) in every other link row W (such rows are referred to as the "guide rows") that are used to position and retain the chain axially on the sprocket and do not drivingly engage the teeth T of the sprocket 10, so the guide link plates 31 can be ignored for the purposes of understanding the present development. The inside links 30 can be assembled in other lacing configurations such as stacked links across a row if desired. Those of ordinary skill in the art will recognize that the term "pins" 40 as used herein is intended to encompass round pins, split pins, rocker joints and/or any other structure(s) that pivotally interconnect the link plates 30 (and 31) of chain 20. FIG. 3A shows only two rows W,W1 of the chain 20.

As shown in FIG. 3A, the inside link plates 30 each have teeth or toes 38 which are defined by inside flanks 35 and outside flanks 36 interconnected by a tip 37 defined by a radius and/or other convexly curved surface. In the illustrated embodiment, the outside flanks 36 are straight-sided (but could be curved) and the inside flanks 35 have a convex arcuate form (but could be straight-sided) and are joined to each other by a crotch 34. In particular, the inside flanks 35 of the toes 38 of each link 30 are defined by a radius R that preferably blends into the tip 37 of the relevant toe 38 and into the crotch 34 at the opposite end. The chain 20 is configured for inside flank engagement at the onset of meshing with a sprocket such as the sprocket 10.

As described more fully below, inside flank engagement means that the initial contact between the chain 20 and the engaging flank E of a sprocket tooth T is at the leading (in terms of chain travel direction) inside flanks 35 of the chain 20. As the meshing chain link row W wraps the sprocket 10 after initial contact, the leading inside flanks thereof separate from the engaging flank E and the trailing outside flanks of the preceding or downstream link row W contact the engaging flank E of the sprocket tooth T.

Figure 4A:
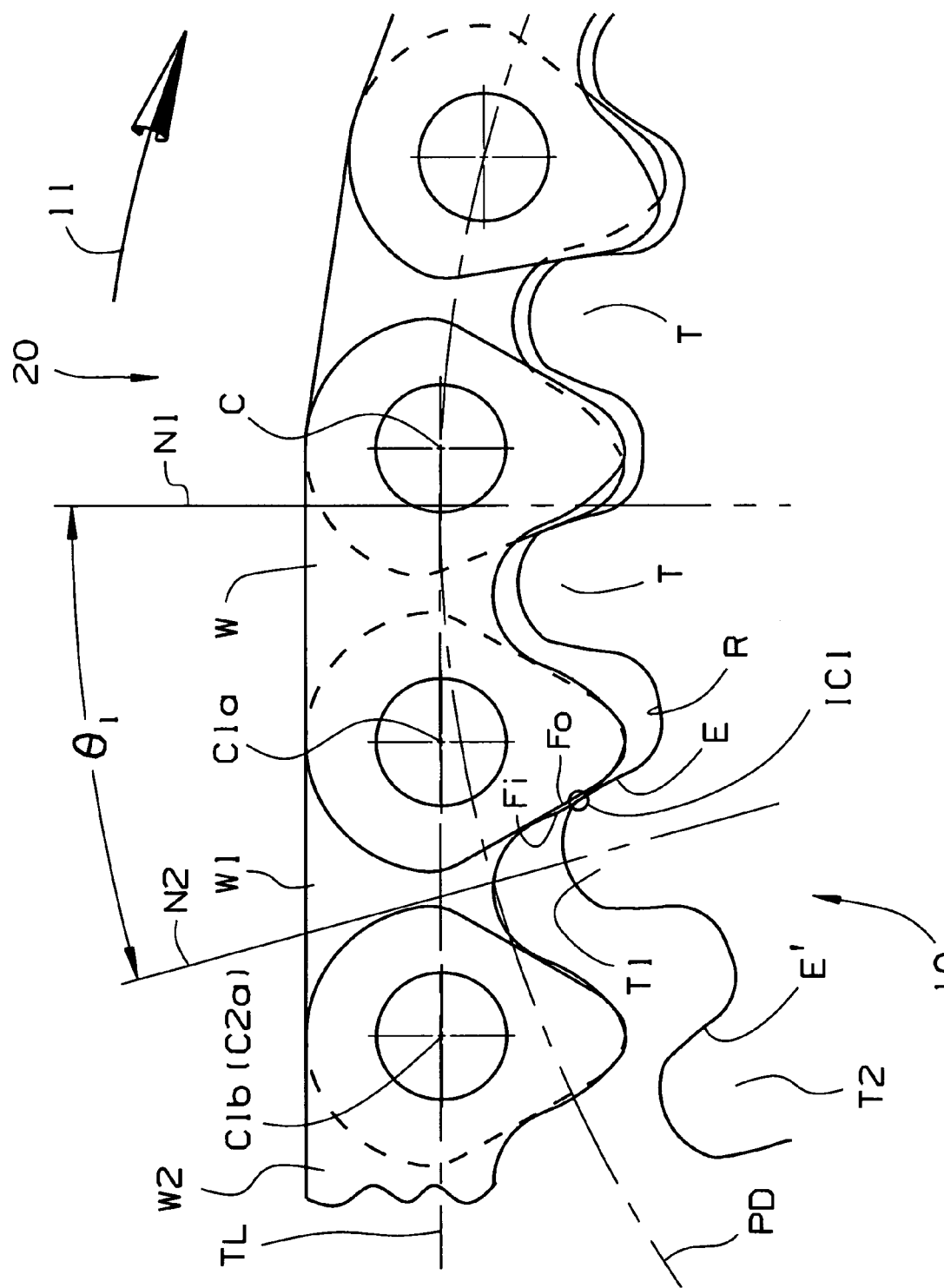
FIG. 4A is a partial front elevational view of a chain drive system comprising a sprocket formed in accordance with the present invention meshing with the inverted tooth chain of FIGS. 3A and 3B (with guide links removed to reveal the underlying link rows for clarity) at the instant of initial meshing contact with a first tooth having an engaging flank defined with a first pressure angle for a sprocket formed in accordance with the present invention.

FIG. 4A is a partial front elevational view of a chain drive system comprising a sprocket 10 formed in accordance with the present invention meshing with a conventional inverted tooth chain 20 (with guide links removed to reveal the underlying link rows for clarity) at the instant of initial meshing contact with a first tooth T1 having an engaging flank E defined with the first pressure angle PA1 so that the initial contact of the leading inside flanks Fi of the chain 20 occurs at location IC1 on the engaging flank E. At this instant of initial meshing contact, a contact angle or initial contact angle $\Theta_1$ is defined between a first vertical reference line N1 that passes through the sprocket axis of rotation X and a 12 o'clock position and a second reference line N2 that passes through the axis of rotation X and the tooth center TC of the subject tooth T1. The first reference line N1 is vertical or located in the 12 o'clock position in the drawings. In the more general case, the first reference line N1 is normal to the tangent line TL of the approaching or free span of the chain 20 and passes through the axis of rotation X. The leading and trailing pin centers of the meshing link row W1 are indicated at C1a,C1b, respectively (note that the leading pin center C1a of link row W1 is also the trailing pin center of preceding or downstream link row W, and the trailing pin center C1b of link row W1 is also the leading pin center C2a of following or upstream link row W2).

Figure 4B:
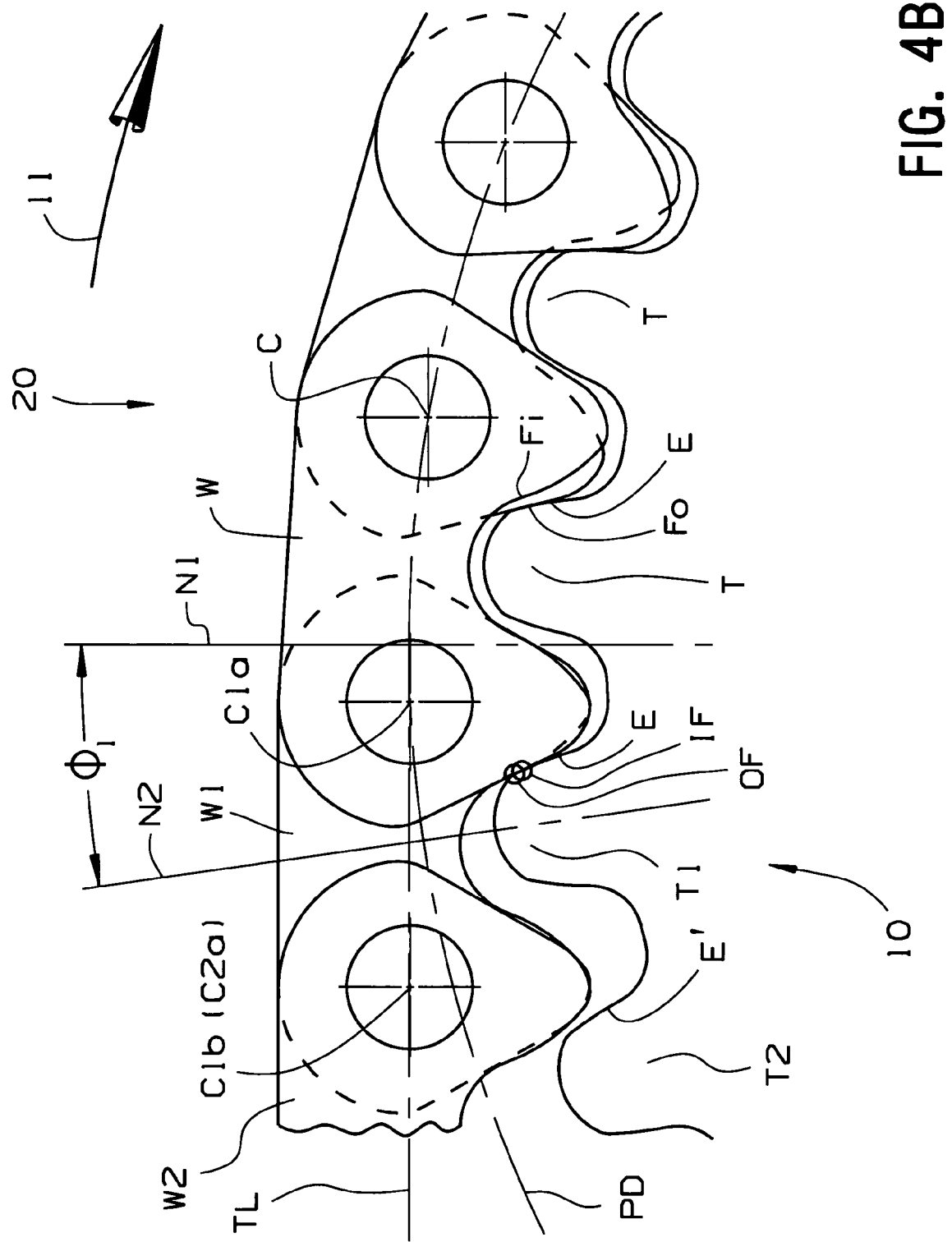
FIG. 4B is a partial front elevational view of the chain drive system of FIG. 4A with the sprocket rotated to a new position where the meshing chain link row is making inside flank contact and the preceding row of the chain is simultaneously making outside flank contact with the engaging flank of the first tooth.

FIG. 4B is a partial front elevational view of the chain drive system of FIG. 4A with the sprocket 10 rotated to a new position where the inside flanks Fi of the meshing chain link row W1 are making inside flank contact with the engaging flank E of tooth T1 at location IF and the trailing outside flanks Fo of the preceding chain link row W are simultaneously making outside flank contact at location OF with the engaging flank E of the first tooth T1. At the illustrated instant, it should be noted that the link row W immediately preceding the meshing link row W1 is fully meshed, with both its leading and trailing pin centers C,C located on the pitch diameter PD (as noted above, the trailing pin center C of this preceding link row W is also the leading pin center C1a of link row W1). At this instant, the trailing pin center C1b of link row W1 is still above the pitch diameter PD. This instant is sometimes referred to herein as the "transition point" because this is the instant when the chain transitions from inside flank contact of row W1 with the engaging flank E of tooth T1 to outside flank contact of preceding row W with the engaging flank E of tooth T1 (the leading inside flanks Fi of link row W1 will separate from the engaging flank E of tooth T1 with the next increment of sprocket rotation). The transition point for a tooth is also deemed the "end of the meshing cycle" for that tooth. At this transition point as shown in FIG. 4B, for the tooth T1 having an engaging flank E defined with the first pressure angle PA1, a transition angle $\phi_1$ is defined between the first reference line N1 and the second reference line N2 that passes through the tooth center TC of the tooth T1. FIGS. 4A and 4B thus illustrate the meshing cycle from initial contact IC1 to the transition point for a tooth such as T1 having an engaging flank E defined with the first pressure angle PA1.

Figure 4C:
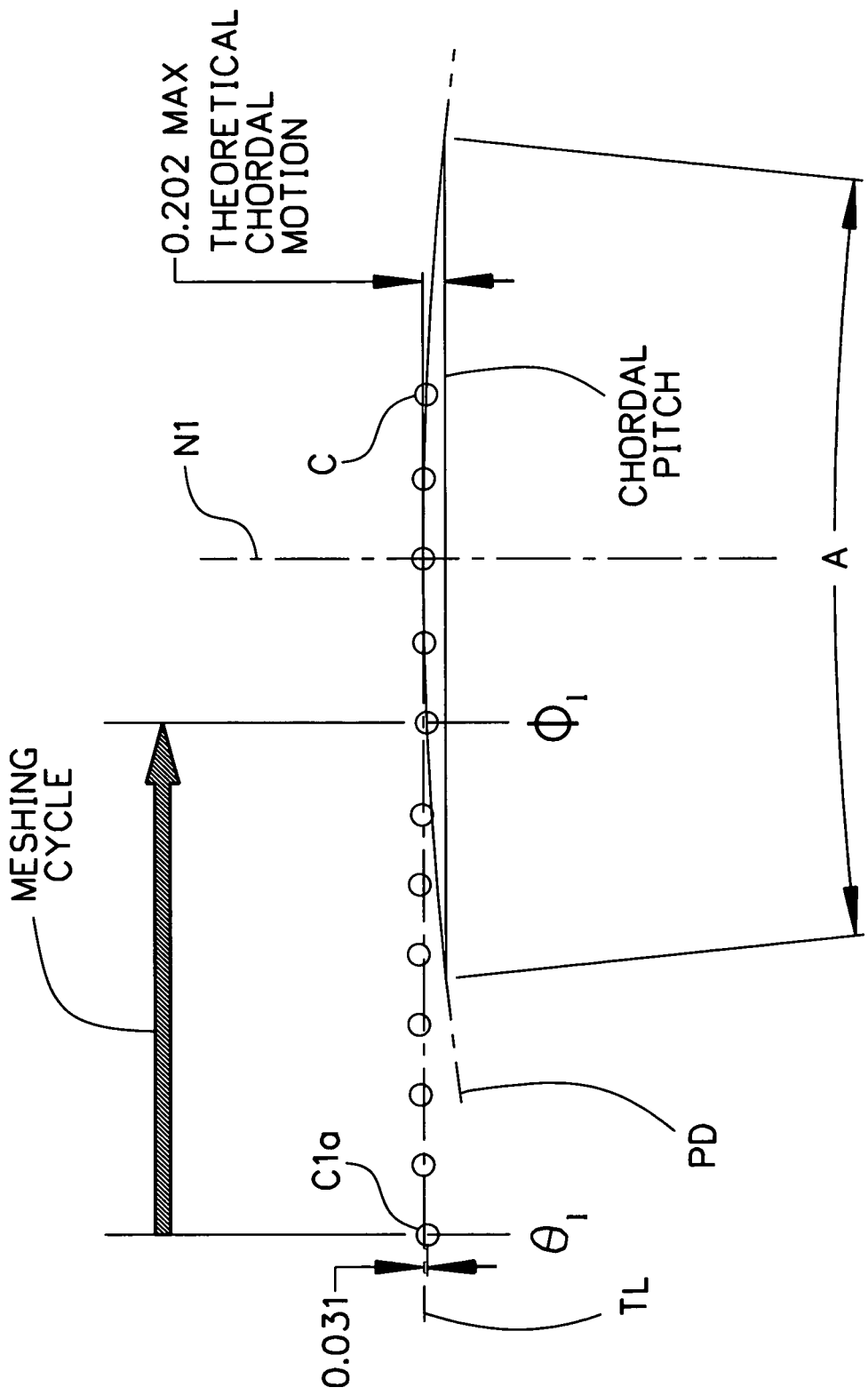
FIG. 4C illustrates the meshing cycle of FIGS. 4A and 4B and the chordal motion of the meshing link row and the approaching chain span.

FIG. 4C illustrates the meshing cycle of FIGS. 4A and 4B and the chordal motion of the meshing link row and the approaching chain span with reference to the leading pin center C1$a$ of the meshing link row W1 as the link row W1 meshes with tooth T1. It can be seen that at the instant of initial contact (indicated by the initial contact angle $\Theta_1$), the pin center C1$a$ is below the tangent line TL by a distance of 0.031 millimeters as compared to a theoretical maximum chordal motion (fall) of 0.202 millimeters (which results from the location of the trailing pin center C of the preceding (downstream) link row W). The chordal motion of the pin center C1$a$ is shown between the initial contact point (indicated at $\Theta_1$) and the transition point (indicated at $\phi_1$), and it can be seen that the pin center C1$a$ varies slightly above and below the tangent line TL. At the transition point (indicated by $\phi_1$), by definition, the pin center C1$a$ is located on the sprocket pitch diameter PD, and the meshing process for the tooth T1 is complete.

Figure 5A:
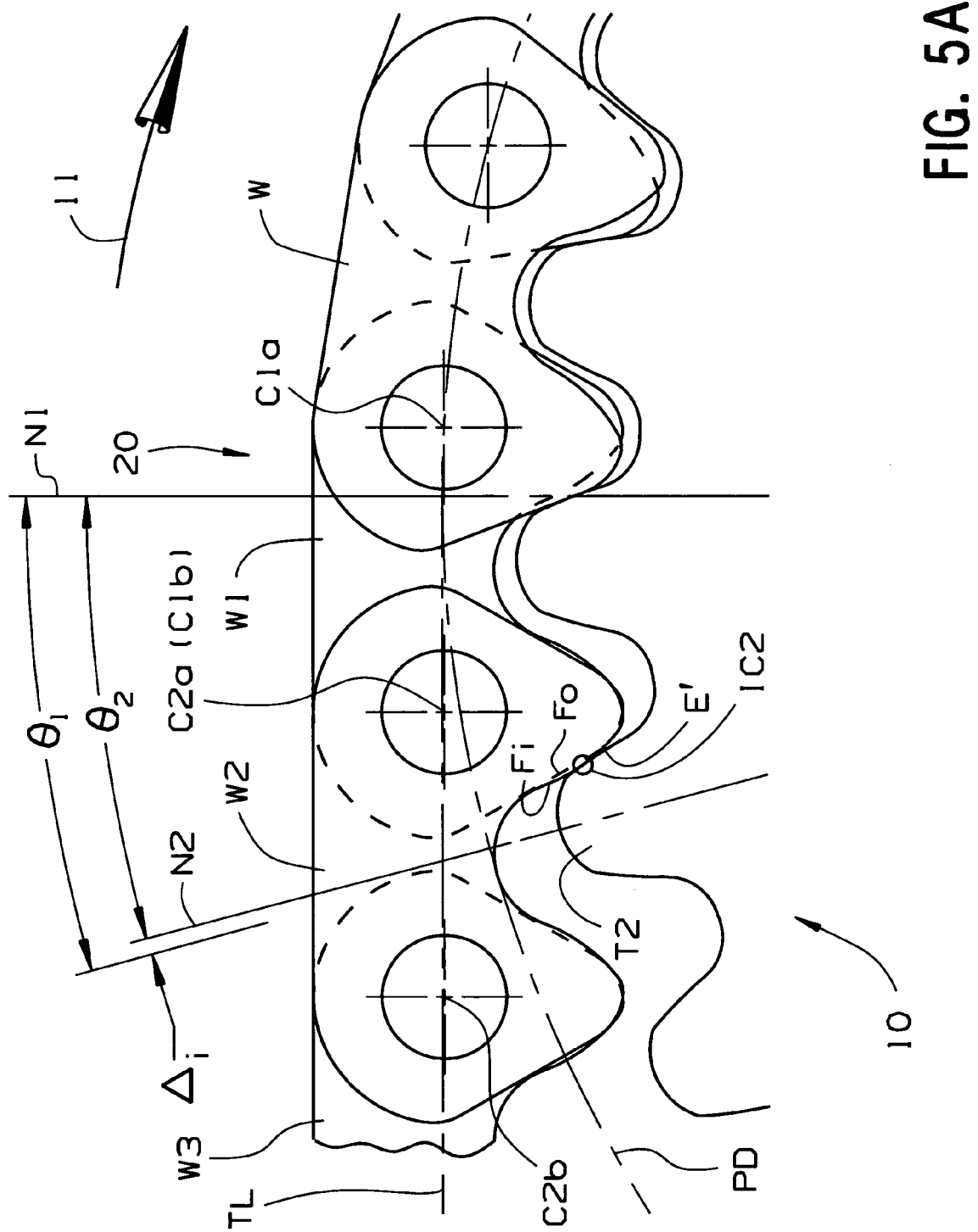
FIG. 5A is similar to FIG. 4A and shows the same sprocket and chain system, but shows the chain at the instant of initial meshing contact with a second tooth of the sprocket that has an engaging flank defined with a second pressure angle.
Figure 5B:
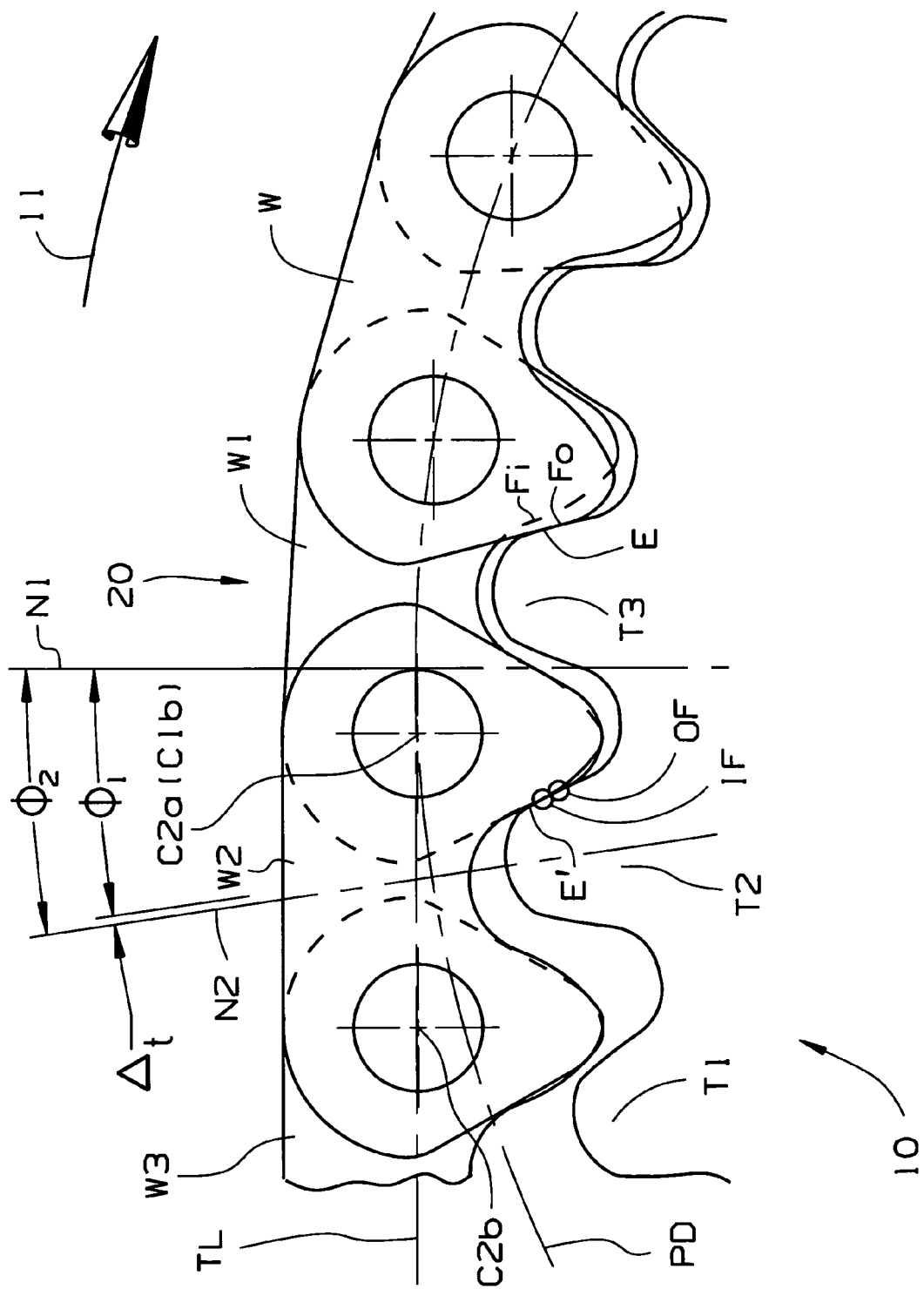
FIG. 5B is similar to FIG. 4B and shows the system of FIG. 5A with the sprocket rotated to a new position where the meshing chain link row is making inside flank contact and the preceding row of the chain is simultaneously making outside flank contact with the engaging flank of the second tooth.

FIGS. 5A and 5B similarly illustrate the meshing cycle from initial contact IC2 to the transition point for a tooth such as T2 having an engaging flank E' defined with the second pressure angle PA2. FIG. 5A is a partial front elevational view of the chain drive system comprising the sprocket 10 meshing with the chain 20 at the instant of initial meshing contact with a second tooth T2 having an engaging flank E' defined with the second pressure angle PA2 so that the initial contact of the leading inside flanks Fi of the chain 20 occurs at location IC2 on the engaging flank E'. At this instant of initial contact, an initial contact angle $\Theta_2$ is defined between the first reference line N1 and the second reference line N2 that passes through the axis of rotation X and the tooth center TC of the subject tooth T2. For the sake of comparison, the initial contact angle $\Theta_1$ is also shown and it can be seen that $\Theta_2 < \Theta_1$ by an amount delta $\Delta_i$. Those of ordinary skill in the art will recognize that the sprocket 10 must rotate by the additional amount delta $\Delta_i$ in order for the chain 20 to make initial contact with the tooth T2 (or any other tooth having an engaging flank E' defined with the second pressure angle PA2) as compared to the tooth T1 (or any other tooth having an engaging flank E defined with the first pressure angle PA1). This means that for a tooth such as T2 having an engaging flank E' defined with the second pressure angle PA2, the initial meshing contact IC2 occurs later as compared to the initial meshing contact IC1 for a tooth such as T1 having an engaging flank E defined with the first pressure angle PA1. The leading and trailing pin centers of the meshing link row W2 are indicated at C2$a$,C2$b$, respectively (note that the leading pin center C2$a$ of link row W2 is also the trailing pin center C1$b$ of preceding link row W1).

FIG. 5B shows the transition point for the tooth T2 and chain link row W2. There, it can be seen that for a tooth such as T2 having an engaging flank E' defined with the second pressure angle PA2, a transition angle $\phi_2$ is defined between the first reference line N1 and the second reference line N2 that passes through the tooth center TC of the tooth T2. For the sake of comparison, the transition angle $\phi_1$ is also shown and it can be seen that $\phi_1 < \phi_2$ by an amount delta $\Delta_t$. This means that the meshing link row W2 of the chain 20 reaches the transition point sooner with a tooth such as the tooth T2 having an engaging flank E' defined with the second pressure angle PA2 as compared to a tooth such as the tooth T1 having an engaging flank E defined with the first pressure angle PA1, i.e., the transition point happens earlier after initial meshing contact for a tooth having an engaging flank E' defined with the second pressure angle PA2 as compared to a tooth having an engaging flank E defined with the first pressure angle PA1.

Figure 5C:
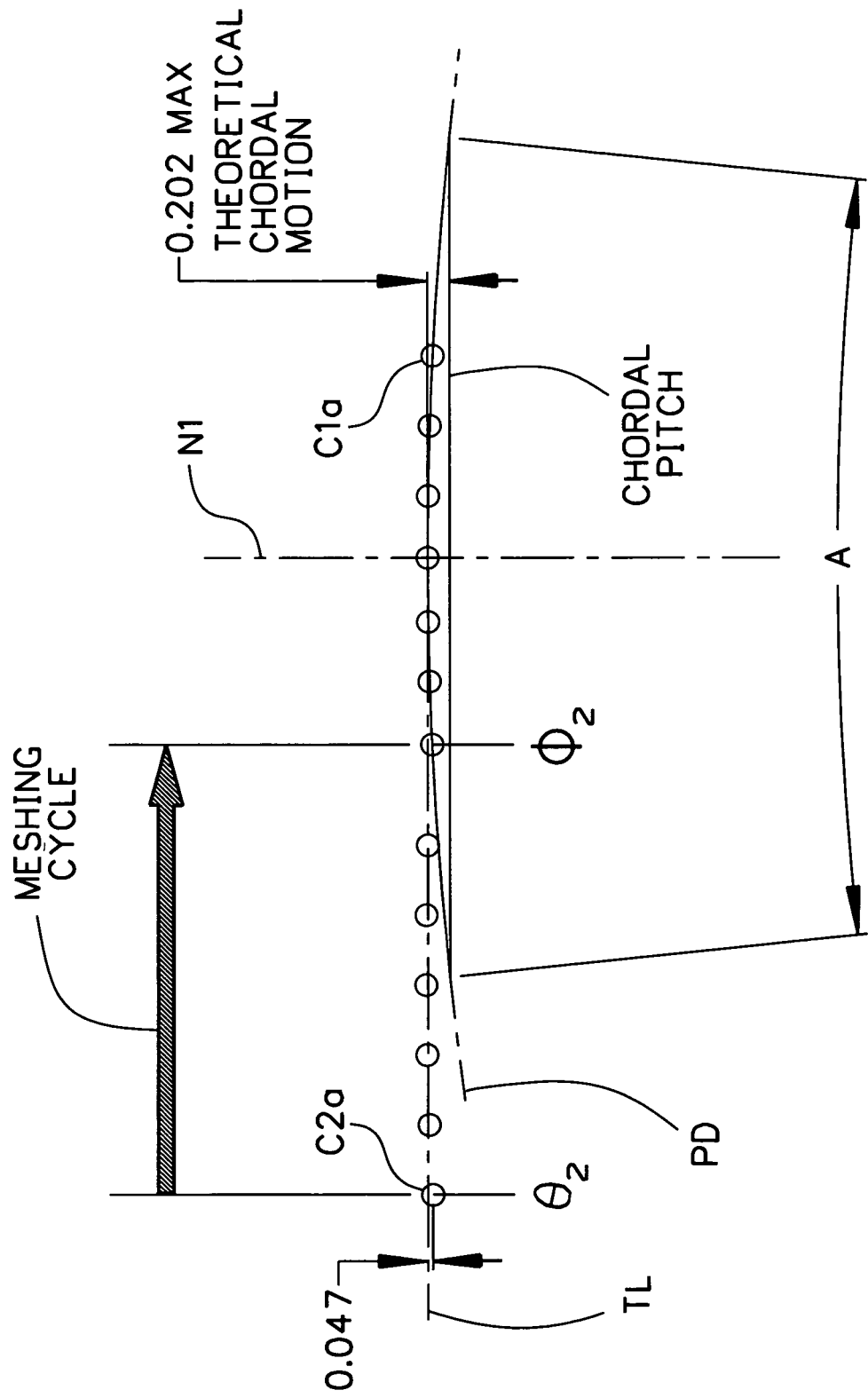
FIG. 5C illustrates the meshing cycle of FIGS. 5A and 5B relative to the chordal motion of the meshing link row and the approaching chain span.

FIG. 5C illustrates the meshing cycle of FIGS. 5A and 5B and the chordal motion of the meshing link row and the approaching chain span with reference to the leading pin center C2$a$ of the meshing link row W2 as the link row W2 meshes with tooth T2. It can be seen that at the instant of initial contact (indicated by the initial contact angle $\Theta_2$), the pin center C2$a$ is below the tangent line TL by a distance of 0.047 millimeters as compared to a theoretical maximum chordal motion (fall) of 0.202 millimeters (which results from the location of the trailing pin center C1$b$ of the preceding (downstream) link row W1). The chordal motion of the pin center C2$a$ is shown between the initial contact point (indicated at $\Theta_2$) and the transition point (indicated at $\phi_2$), and it can be seen that the pin center C2$a$ varies slightly above and below the tangent line TL. At the transition point (indicated by $\phi_2$), the pin center C2$a$ is located on the sprocket pitch diameter PD, and the meshing process for the tooth T2 is complete.

FIG. 6 graphically illustrates the meshing dynamics of FIGS. 4C and 5C in terms of chordal motion of the meshing chain link row versus sprocket angular rotation in degrees. For the illustrated 30-tooth sprocket 10, the tooth angle is 12 degrees. The tangent line TL is shown, corresponding to 0.00 millimeters of chordal motion. The maximum theoretical chordal fall is shown with a broken line at the −0.202 millimeter chordal motion position. The chordal motion of the pin center C1$a$, corresponding to FIG. 4C, is shown by the trace line L1 in region "FIG. 4C" of the graph, between 0 degrees of rotation at initial contact ($\Theta_1$) and 12.55 degrees of rotation. The chordal motion of the pin center C2$a$, corresponding to FIG. 5C, is shown by the trace line L2 in region "FIG. 5C" of the graph, between 12.55 degrees of rotation at initial contact ($\Theta_2$) and 24.00 degrees of rotation.

Those of ordinary skill in the art will recognize from the foregoing that the two (or more) different tooth forms incorporated into the full complement of sprocket teeth of the sprocket in a random (irregular) or fixed pattern will serve to modulate the initial meshing impacts IC1,IC2 between the chain and sprocket teeth. As such, the sprocket will exhibit improved noise and vibration as compared to a conventional inverted tooth sprocket. Because the tooth spaces TS are symmetrical, the sprocket can be run bi-directionally without altering its function. This simplifies installation of the sprocket because it can be installed without regard to which of its front and back faces is facing outward if the structure of the sprocket is otherwise symmetrical.

FIG. 7 graphically illustrates the pattern of the two different tooth forms (in terms of engaging flank pressure angle) and the initial meshing contact angles for the sprocket of FIG. 1. In the example, PA1=28.5° for the engaging flanks E and PA2=31° for the engaging flanks E', and the total tooth count N=30 (meaning that the tooth centers TC will be spaced every 12°). Each tooth is defined with an engaging flank E or E' as noted in the chart, e.g., tooth no. 1 is defined with an engaging flank E having a 28.5° pressure angle PA1 and tooth no. 2 is defined with an engaging flank E' having a 31° pressure angle PA2. As shown in the chart, the initial contact angle $\Theta_1$ for the teeth defined with the engaging flank E is 15.55° while the initial contact angle $\Theta_2$ for the teeth defined with the engaging flank E' is only 15°, which leads to a $\Delta_i=0.55°$. The teeth with engaging flanks E defined with the smaller first pressure angle PA1 outnumber the teeth with engaging flanks E' defined with the larger second pressure angle PA2. Thus, the teeth with engaging flanks E defined with first pressure angle PA1 can arbitrarily be referred to as the "base" or "standard" teeth, while the fewer teeth with engaging flanks E' defined with the second pressure angle PA2 can be referred to as the "modulated meshing" teeth. Also, it is not intended that the magnitude of the first and second pressure angles PA1,PA2 be limited to the examples used herein.

Automotive camshaft drive sprockets are often manufactured by powder metal processing, a cost-effective means of sprocket manufacture. For the more highly loaded chain drives, however, steel sprockets are often required and a sprocket manufactured from a steel blank or barstock will generally have its teeth cut by the hobbing process.

According to another aspect of the present development, it has been deemed desirable to provide an inverted tooth chain sprocket with frequency modulated meshing as described above in relation to FIGS. 1-7, but further refined so that the sprocket includes two or more different tooth forms arranged in a specific repeating pattern such that the number of teeth in the pattern is evenly divisible into the full tooth count of the sprocket, which allows the sprocket to be manufactured using a multiple thread hob tool (such a sprocket is referred to herein as being "hob-compatible"). This relationship can be expressed as:

$$W=N/NP$$

where N=sprocket tooth count, NP=number of teeth in the repeating pattern, where W=an integer (whole number) in order to define a sprocket optimized for manufacture by hobbing in accordance with this aspect of the present development. In such case, the thread count of the hob must also be evenly divisible into the sprocket tooth count so that the tooth pattern can be properly repeated. Examples for the number of teeth in the repeating pattern are three, four, or five, i.e., NP=3, NP=4, or NP=5, but other patterns are within the scope of the present development.

Figure 8A:
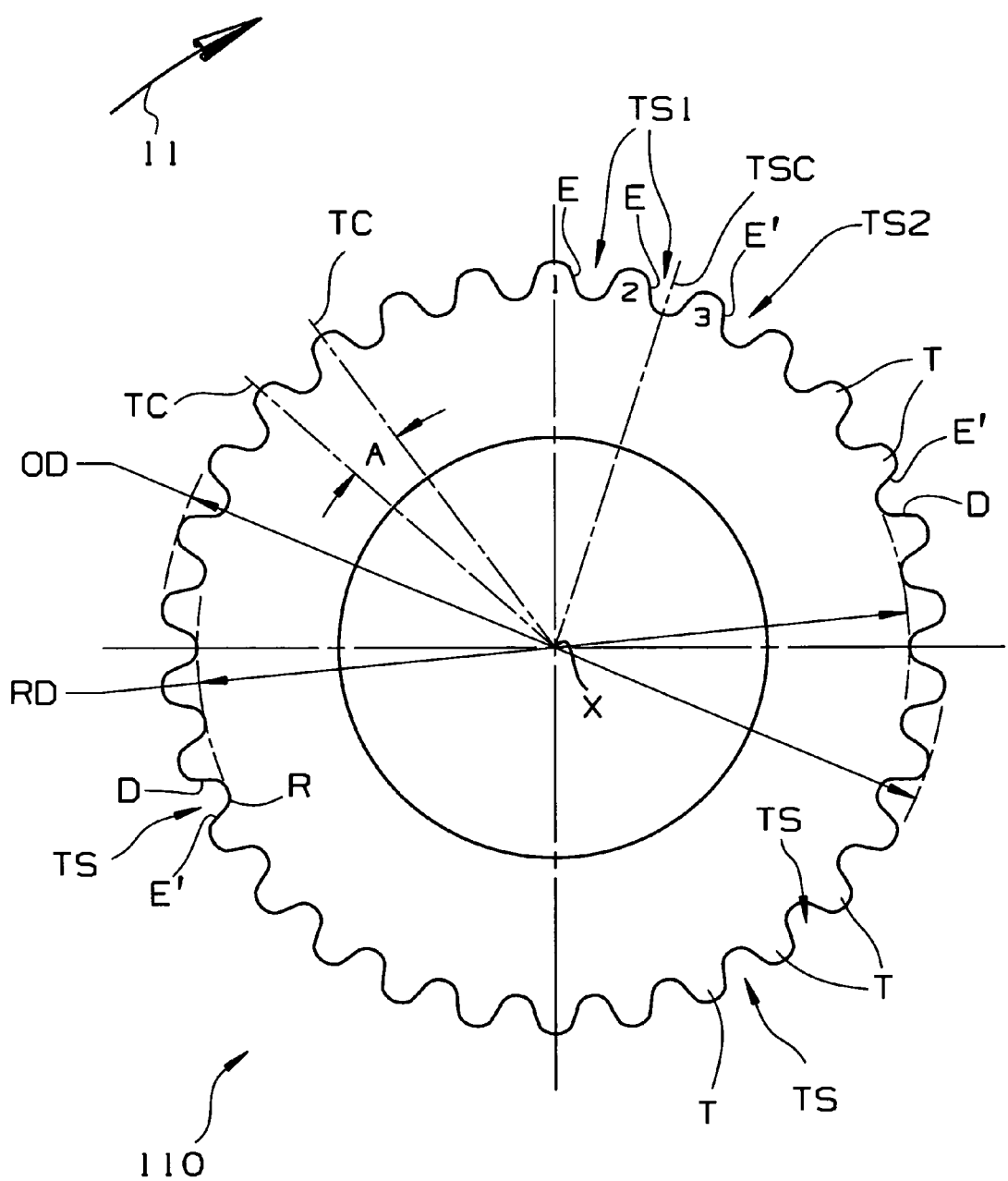
FIG. 8A is a front elevational view of an inverted tooth chain sprocket having two different tooth forms (in terms of engaging flank pressure angle) arrayed in a 3-tooth repeating "hob-compatible" pattern in accordance with the present invention.

FIG. 8A shows one such hob-compatible sprocket 110 defined in accordance with this aspect of the present development, wherein the above equation is satisfied as follows:

$$W=N/NP=30/3=10$$

where it can be seen that N=30 and NP=3. Except as otherwise shown and/or described, the sprocket 110 is defined according to the present development as described above for the sprocket 10 of FIG. 1. More particularly, in the illustrated embodiment of the sprocket 110, the repeating tooth pattern is a three-tooth pattern comprising two successive teeth (labeled "1" and "2") having engaging flanks E defined with a first pressure angle PA1 and a third tooth (labeled "3") having an engaging flank E' defined with a second pressure angle PA2. This three-tooth pattern is repeated about the sprocket and can be used for any total tooth count divisible by 3, such as for the 30-tooth sprocket 110.

Figure 8B:
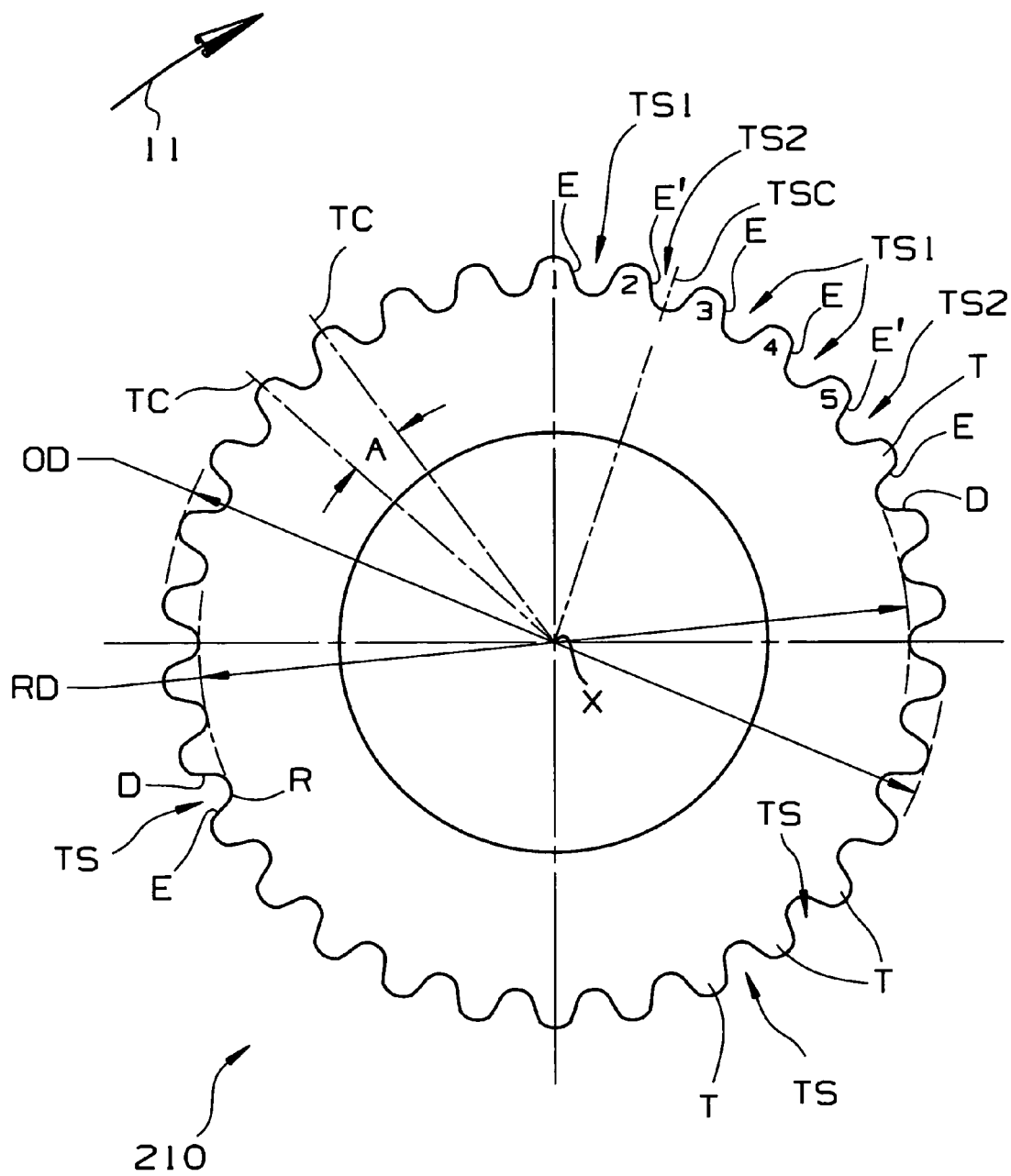
FIG. 8B is a front elevational view of an inverted tooth chain sprocket having two different tooth forms (in terms of engaging flank pressure angle) arrayed in a 5-tooth repeating "hob-compatible" pattern in accordance with the present invention.

FIG. 8B shows another hob-compatible sprocket 210 that is defined in accordance with the present invention as described above for the sprocket 10, and further defined to be "hob-compatible" in accordance with this additional aspect of the present development, wherein the above equation is satisfied as follows:

$$W=N/NP=30/5=6$$

where it can be seen that N=30 and NP=5. In the illustrated embodiment of the sprocket 210, the repeating tooth pattern is a five-tooth pattern comprising one tooth (labeled "1") having an engaging flank E defined with a first pressure angle PA1, a downstream second tooth (labeled "2") having an engaging flank E' defined with a second pressure angle PA2, two successive further downstream teeth (labeled "3" and "4") having engaging flanks E defined with the first pressure angle PA1, and a final, farthest downstream tooth (labeled "5") having an engaging flank E' defined according to the second pressure angle PA2. This five-tooth pattern is repeated about the sprocket and can be used for any total tooth count divisible by 5, such as for the 30-tooth sprocket 210.

FIGS. 9A and 9B graphically illustrates the hob-compatible tooth patterns and the resulting initial meshing contact angles for the sprockets 110,210 of FIGS. 8A and 8B, respectively. In the example, PA1=28.5° for the engaging flanks E and PA2=31° for the engaging flanks E', and the total tooth count N=30 (meaning that the tooth centers TC will be spaced every 12°). Each tooth is defined with an engaging flank E or E' as noted in the chart. It can be seen that the chart of FIG. 9A reflects the three-tooth repeating pattern PA1,PA1,PA2 (or E,E,E') beginning with tooth no. 1. Likewise, the chart of FIG. 9B reflects the five-tooth repeating pattern PA1,PA2,PA1, PA1,PA2 (or E,E',E,E,E') beginning with tooth no. 1. As shown in the charts, the initial contact angle for the teeth defined with the engaging flank E is 15.55° while the initial contact angle for the teeth defined with the engaging flank E' is only 15°, which leads to a $\Delta_i=0.55°$. The teeth with engaging flanks E defined with first pressure angle PA1 outnumber the teeth with engaging flanks E' defined with the second pressure angle PA2, and can thus be referred to as the "standard" teeth and the "modulated meshing" teeth, respectively.

It is not intended that a hob-compatible sprocket defined in accordance with the present invention be limited to the three-tooth or five-tooth repeating patterns of FIGS. 9A and 9B, and other hob-compatible repeating tooth patterns can be used according to the present invention, provided the above noted relationship between the tooth count N and number of teeth in the repeating pattern NP is satisfied.

Those of ordinary skill in the art will recognize that the involute engaging and disengaging flanks E,D,E',D' can be approximated and replaced by a radial form.

From the above, those of ordinary skill in the art will recognize that an inverted tooth chain drive system in accordance with the present development includes a sprocket supported for rotation about an axis of rotation and comprising a plurality of teeth defined relative to respective tooth centers. The tooth centers are spaced evenly in a circumferential arrangement about the axis of rotation, and each of the plurality of teeth includes an engaging flank and a disengaging flank. A conventional inverted tooth chain 20 is engaged with the sprocket and includes a plurality of rows W (W1,W2, . . . Wn) of links each structured for inside flank engagement with the sprocket, i.e., at the instant of initial contact with the sprocket, the leading inside flanks Fi of each row W of links project outwardly relative to the trailing outside flanks Fo of a preceding row W of links so that the initial contact with the sprocket tooth is made by the leading inside flanks Fi of the link row (see rows W1,W2 shown in FIG. 4A). The leading inside flanks Fi of each chain link row are thus positioned to make initial meshing contact with the engaging flank of the sprocket teeth.

According to one aspect of the present development, at least two different tooth forms (in terms of engaging flank pressure angle) will be incorporated into the full complement of sprocket teeth of the sprocket in a random (irregular) or fixed pattern in order to stagger or modulate the initial meshing impacts between the chain and sprocket teeth. This is achieved by utilizing a different pressure angle for each of the two (or more) tooth forms. The involute form of the tooth flanks is generated from the base circle and the base circle is defined as:

$$\text{Base Circle}=PD \times COS(PA), \text{ where}$$

PD=sprocket pitch diameter, and PA=tooth pressure angle
Furthermore, the pitch diameter PD, itself, is defined as:

$$PD=P/\text{SIN}(180/N), \text{ where}$$

where P=pitch, and N=number of teeth in sprocket

According to this aspect of the present development, in contrast with known sprockets, at least some of the teeth will have involute engaging flanks defined as a function of a first pressure angle and at least some other teeth will have involute engaging flanks defined as a function of a second pressure angle (the term "engaging flank" is intended to mean the tooth flank that makes initial contact with the meshing chain, with the opposite tooth flank being the "disengaging" flank). Regardless of how defined, an engaging tooth flank with a smaller pressure angle is steeper as compared to a tooth flank with a larger pressure angle.

In accordance with another aspect of the present development, the disengaging flanks of the sprocket teeth are defined with respective pressure angles that match the pressure angle of the engaging flank of the next-to-mesh or upstream sprocket tooth so that the space between successive sprocket teeth is symmetrical. This requires that at least some of the teeth have engaging and disengaging flanks defined according to dissimilar pressure angles, while each tooth is still centered on its respective tooth center, with the tooth centers being spaced evenly in a circumferential arrangement about the axis of rotation at a tooth angle A=360°/N where N is the total number of teeth.

In accordance with another aspect of the present development, an inverted tooth chain drive sprocket having two or more different tooth forms (in terms of the pressure angle of the engaging flanks) is optimized to allow for the sprocket to be manufactured by a hobbing process. Automotive camshaft drive sprockets are often manufactured by powder metal processing, a cost-effective means of sprocket manufacture. For the more highly loaded chain drives, however, steel sprockets are often required and a sprocket manufactured from a steel blank or barstock will generally have its teeth cut by the hobbing process. According to this aspect of the present development, an inverted tooth chain sprocket with frequency modulated meshing is optimized for manufacture by a hobbing process, by arranging the different tooth forms in a specific "hob-compatible" pattern.

The invention has been described with reference to preferred embodiments. Modifications and alterations will occur to those of ordinary skill in the art to which the invention pertains, and it is intended that the invention be construed as encompassing all such modifications and alterations.

The invention claimed is:

1. A sprocket adapted to mesh with an associated inverted tooth chain, said sprocket comprising:
a plurality of teeth circumferentially spaced about an axis of rotation, each tooth comprising an engaging flank and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is larger than said first pressure angle;

wherein said engaging flank of each tooth defined with said first tooth form is steeper than said engaging flank of each tooth defined with said second tooth form, wherein said steepness of said engaging flank of each tooth is measured relative to a radial tooth center reference line that extends through the axis of rotation and a tooth center of said tooth; and, wherein circumferentially successive teeth of said plurality of teeth are separated by tooth spaces defined by said engaging flank of a first tooth and said disengaging flank of a second tooth, wherein said engaging flank and disengaging flank comprise mirror images of each other such that each of said tooth spaces is symmetrically defined relative to a tooth space center, for all tooth spaces of said sprocket.

2. The sprocket as set forth in claim 1, wherein said first and second tooth forms are distributed as part of said plurality of teeth in a non-repeating, irregular pattern.

3. The sprocket as set forth in claim 1, wherein each of said plurality of teeth of said sprocket comprises either said first or said second tooth form, and said teeth comprising said first and second tooth forms are arranged in a repeating pattern so as to define a hob-compatible relationship:

$$W=N/NP$$

where N=sprocket tooth count equal to the total number of said plurality of teeth, NP=number of teeth in the repeating pattern, and W=a positive integer.

4. The sprocket as set forth in claim 1, wherein more than 50% of said teeth are defined with said first tooth form.

5. A sprocket adapted to mesh with an associated inverted tooth chain, said sprocket comprising:
a plurality of teeth circumferentially spaced about an axis of rotation, each tooth comprising an engaging flank and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is larger than said first pressure angle;

wherein said engaging flank of each tooth defined with said first tooth form is steeper than said engaging flank of each tooth defined with said second tooth form, wherein said steepness of said engaging flank of each tooth is measured relative to a radial tooth center reference line that extends through the axis of rotation and a tooth center of said tooth;

wherein each of said plurality of teeth of said sprocket comprises either said first or said second tooth form, and said teeth comprising said first and second tooth forms are arranged in a repeating pattern so as to define a hob-compatible relationship:

$$W=N/NP$$

where N=sprocket tooth count equal to the total number of said plurality of teeth, NP=number of teeth in the repeating pattern, W=a positive integer, and wherein NP=3 or NP=4 or NP=5.

6. A sprocket adapted to mesh with an associated inverted tooth chain, said sprocket comprising:
a plurality of teeth circumferentially spaced about an axis of rotation, each tooth comprising a tooth center, an engaging flank, and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is larger than said first pressure angle;

wherein said engaging flank of each tooth defined with said first tooth form is steeper than said engaging flank of each tooth defined with said second tooth form, wherein said steepness of said engaging flank of each tooth is measured relative to a radial tooth center reference line that extends through the axis of rotation and the tooth center of said tooth;

wherein circumferentially successive teeth of said plurality of teeth are separated by tooth spaces defined by said engaging flank of a first tooth and said disengaging flank of a second tooth, wherein said engaging flank and disengaging flank comprise mirror images of each other such that each of said tooth spaces is symmetrically defined relative to a tooth space center, for all tooth spaces of said sprocket; and, wherein:

said respective tooth centers of said plurality of teeth are spaced uniformly circumferentially about said axis of rotation at a tooth angle spacing A=360°/N, where N=sprocket tooth count equal to the total number of said plurality of teeth;

some of said teeth are defined symmetrically relative to the tooth center thereof with said engaging flank and disengaging flank thereof being mirror images of each other defined with matching pressure angles selected from said first and second pressure angles; and, others of said teeth are defined asymmetrically relative to the tooth center thereof with said engaging flank and disengaging flank thereof defined with different pressure angles as compared to each other.

7. An inverted tooth chain drive system comprising:

an inverted tooth chain structured for inside flank engagement, said chain comprising link rows each including leading inside flanks that project outwardly relative to trailing outside flanks of a preceding link row; and, a sprocket with which said inverted tooth chain is drivingly engaged, said sprocket comprising a plurality of teeth circumferentially spaced about an axis of rotation, each tooth comprising an engaging flank and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is larger than said first pressure angle;

wherein said engaging flank of each tooth defined with said first tooth form is steeper than said engaging flank of each tooth defined with said second tooth form, wherein said steepness of said engaging flank of each tooth is measured by a flank angle defined between a radial tooth center reference line that extends through the axis of rotation and a tooth center of said tooth and a second reference line that is tangent to an initial contact location where said chain makes initial meshing contact with said tooth, said flank angle for each tooth defined with said first tooth form being smaller than said flank angle for each tooth defined with said second tooth form; and, wherein circumferentially successive teeth of said plurality of teeth are separated by tooth spaces defined by said engaging flank of a first tooth and said disengaging flank of a second tooth, wherein said engaging flank and disengaging flank comprise mirror images of each other such that each of said tooth spaces is symmetrically defined relative to a tooth space center, for all tooth spaces of said sprocket.

8. The inverted tooth chain drive system as set forth in claim 7, wherein said first and second tooth forms are distributed as part of said plurality of teeth in a non-repeating, irregular pattern.

9. The inverted tooth chain drive system as set forth in claim 7, wherein each of said plurality of teeth of said sprocket comprises either said first or said second tooth form, and said teeth comprising said first and second tooth forms are arranged in a repeating pattern so as to define a hob-compatible relationship:

$$W=N/NP$$

where N=sprocket tooth count equal to the total number of said plurality of teeth, NP=number of teeth in the repeating pattern, and W=a positive integer.

10. The inverted tooth chain drive system as set forth in claim 7, wherein:

said plurality of teeth comprise respective tooth centers spaced uniformly circumferentially about said axis of rotation at a tooth angle spacing A=360°/N, where N=sprocket tooth count equal to the total number of said plurality of teeth;

some of said teeth are defined symmetrically relative to the tooth center thereof with said engaging flank and disengaging flank thereof being mirror images of each other defined with matching pressure angles selected from said first and second pressure angles; and, others of said teeth are defined asymmetrically relative to the tooth center thereof with said engaging flank and disengaging flank thereof defined with different pressure angles as compared to each other.

11. The inverted tooth chain drive system as set forth in claim 7, wherein more than 50% of said teeth are defined with said first tooth form.

12. An inverted tooth chain drive system comprising:

an inverted tooth chain structured for inside flank engagement, said chain comprising link rows each including leading inside flanks that project outwardly relative to trailing outside flanks of a preceding link row; and, a sprocket with which said inverted tooth chain is drivingly engaged, said sprocket comprising a plurality of teeth circumferentially spaced about an axis of rotation, each tooth comprising a tooth center, an engaging flank, and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is larger than said first pressure angle;

wherein said engaging flank of each tooth defined with said first tooth form is steeper than said engaging flank of each tooth defined with said second tooth form, wherein said steepness of said engaging flank of each tooth is measured by a flank angle defined between a radial tooth center reference line that extends through the axis of rotation and the tooth center of said tooth and a second reference line that is tangent to an initial contact location where said chain makes initial meshing contact with said tooth, said flank angle for each tooth defined with said first tooth form being smaller than said flank angle for each tooth defined with said second tooth form;

wherein:

said respective tooth centers of said plurality of teeth are spaced uniformly circumferentially about said axis of rotation at a tooth angle spacing A=360°/N, where N=sprocket tooth count equal to the total number of said plurality of teeth;

said chain comprises a free span adapted to approach and mesh with said sprocket along a tangent line;

the leading inside flanks of each meshing link row of said chain from said free span make inside flank contact with the engaging flank of a sprocket tooth upon initial contact between said chain and said sprocket such that:

(i) a first initial contact angle $\Theta$ is defined at an instant of initial contact between said chain and one of said sprocket teeth defined according to said first tooth form;

(ii) a second initial contact angle $\Theta_2$ is defined at an instant of initial contact between said chain and one of said sprocket teeth defined according to said second tooth form, wherein $\Theta_2$ is less than $\Theta_1$, with said first and second initial contact angles $\Theta_1$ and $\Theta_2$ defined between a first initial contact reference line and a second initial contact reference line wherein: (i) said first initial contact reference line originates at said axis of rotation and extends normal to said tangent line; (ii) said second initial contact reference line originates at said axis of rotation and passes through said tooth center of said tooth with which said chain is making inside flank initial contact.

13. The inverted tooth chain drive system as set forth in claim 12, wherein, at a transition point, the trailing outside flanks of the chain link row preceding said meshing link row contact the engaging flank of the sprocket tooth with which said leading inside flanks of said meshing link row are in contact, wherein said transition point occurs sooner in terms of angular rotation of said sprocket when the meshing link row is meshing with one of said sprocket teeth defined according to said second tooth form as compared to when the meshing link row is meshing with one of said sprocket teeth defined according to said first tooth form.

14. An inverted tooth chain drive system comprising:
an inverted tooth chain; and,
a sprocket engaged with said inverted tooth chain, said sprocket comprising a plurality of teeth circumferentially spaced about an axis of rotation, each tooth comprising an engaging flank and a disengaging flank, wherein circumferentially successive teeth are separated from each other by respective tooth spaces partially defined an engaging flank of a first tooth and a disengaging flank of a second tooth, wherein said disengaging flank of said second tooth is a mirror image of the engaging flank of the first tooth for all tooth spaces of said sprocket, and wherein said respective engaging flanks of some of said teeth are defined with a first pressure angle and respective engaging flanks of others of said teeth are defined with a second pressure angle that is larger than said first pressure angle so that the respective engaging flanks of the teeth defined with the first pressure angle are steeper as compared to the respective engaging flanks of the teeth defined with the second pressure angle;

wherein every tooth space of said sprocket is symmetrically defined in terms of the pressure angle of the engaging flank and the pressure angle of the disengaging flank of the tooth space.

15. The inverted tooth chain drive system as set forth in claim 14, wherein said sprocket is hob-compatible in that said sprocket satisfies the relationship:

$W=N/NP$ where N=sprocket tooth count equal to the total number of said plurality of teeth, NP=number of teeth in the repeating pattern, and W=a positive integer.

16. An inverted tooth chain drive system comprising:
an inverted tooth chain structured for inside flank engagement, said chain comprising link rows each including leading inside flanks that project outwardly relative to trailing outside flanks of a preceding link row; and,
a sprocket with which said inverted tooth chain is drivingly engaged, said sprocket comprising a plurality of teeth circumferentially spaced about an axis of rotation, each tooth comprising an engaging flank and a disengaging flank, wherein some of said teeth are defined with a first tooth form in which said engaging flank thereof is defined with a first pressure angle and others of said teeth are defined with a second tooth form in which said engaging flank thereof is defined with a second pressure angle that is larger than said first pressure angle;
wherein said engaging flank of each tooth defined with said first tooth form is steeper than said engaging flank of each tooth defined with said second tooth form, wherein said steepness of said engaging flank of each tooth is measured by a flank angle defined between a radial tooth center reference line that extends through the axis of rotation and a tooth center of said tooth and a second reference line that is tangent to an initial contact location where said chain makes initial meshing contact with said tooth, said flank angle for each tooth defined with said first tooth form being smaller than said flank angle for each tooth defined with said second tooth form;
wherein each of said plurality of teeth of said sprocket comprises either said first or said second tooth form, and said teeth comprising said first and second tooth forms are arranged in a repeating pattern so as to define a hob-compatible relationship:

$W=N/NP$ where N=sprocket tooth count equal to the total number of said plurality of teeth, NP=number of teeth in the repeating pattern, and W=a positive integer, wherein NP=3 or NP=4 or NP=5.

* * * * *